US011836137B2

(12) United States Patent
Nash et al.

(10) Patent No.: US 11,836,137 B2
(45) Date of Patent: Dec. 5, 2023

(54) REAL-TIME STREAMING GRAPH QUERIES

(71) Applicant: CrowdStrike, Inc., Sunnyvale, CA (US)

(72) Inventors: Brent Ryan Nash, Ladera Ranch, CA (US); James Robert Plush, Lake Forest, CA (US); Timothy Jason Berger, Eastvale, CA (US); Hyacinth D. Diehl, Minneapolis, MN (US)

(73) Assignee: CrowdStrike, Inc., Sunnyvale, CA (US)

( * ) Notice: Subject to any disclaimer, the term of this patent is extended or adjusted under 35 U.S.C. 154(b) by 14 days.

(21) Appl. No.: 17/325,097

(22) Filed: May 19, 2021

(65) Prior Publication Data
US 2022/0374434 A1    Nov. 24, 2022

(51) Int. Cl.
G06F 16/2455 (2019.01)
G06F 16/901 (2019.01)

(52) U.S. Cl.
CPC .... *G06F 16/24568* (2019.01); *G06F 16/9024* (2019.01)

(58) Field of Classification Search
None
See application file for complete search history.

(56) References Cited

U.S. PATENT DOCUMENTS

| 7,840,501 | B1 | 11/2010 | Sallam |
| 8,779,921 | B1 | 7/2014 | Curtiss |
| 9,043,903 | B2 | 5/2015 | Diehl et al. |
| 9,069,930 | B1 | 6/2015 | Hart |
| 9,202,249 | B1 | 12/2015 | Cohen et al. |
| 9,386,165 | B2 | 7/2016 | Raleigh et al. |
| 9,661,003 | B2 | 5/2017 | Parker |
| 10,200,262 | B1 | 2/2019 | Leverich et al. |
| 10,320,831 | B2 | 6/2019 | Agarmore et al. |

(Continued)

FOREIGN PATENT DOCUMENTS

| CN | 105550189 A | 5/2016 |
| EP | 3896934 | 10/2021 |

(Continued)

OTHER PUBLICATIONS

Coppolino, et al., "A framework for mastering heterogeneity in multi-layer security information and event correlation", Journal of Systems Architecture, vol. 62, Dec. 2, 2015, pp. 78-88.

(Continued)

*Primary Examiner* — Alex Gofman
*Assistant Examiner* — Umar Mian
(74) *Attorney, Agent, or Firm* — Lee & Hayes, P.C.

(57) ABSTRACT

An event query host can include an event processor configured to process an event stream indicating events that occurred on a computing device. The event processor can add representations of events to an event graph. If an event added to the event graph is a trigger event associated with a query, the event processor can also add an instance of the query to a query queue. The query queue can be sorted based on scheduled execution times of query instances. At a scheduled execution time of a query instance in the query queue, a query manager of the event query host can execute the query instance and attempt to find a corresponding pattern of one or more events in the event graph.

19 Claims, 8 Drawing Sheets

(56) References Cited

U.S. PATENT DOCUMENTS

| | | | |
|---|---|---|---|
| 10,382,454 B2 | 8/2019 | Avidan et al. |
| 10,498,744 B2 | 12/2019 | Hunt |
| 10,523,540 B2 | 12/2019 | Joshi |
| 10,523,914 B1 | 12/2019 | Phillips et al. |
| 10,659,432 B2 | 5/2020 | Meyer et al. |
| 10,673,880 B1 | 6/2020 | Pratt et al. |
| 10,749,557 B1 | 8/2020 | Griffin et al. |
| 10,951,606 B1 | 3/2021 | Shahidzadeh et al. |
| RE48,656 E | 7/2021 | Goldner et al. |
| 11,132,461 B2 | 9/2021 | Swafford |
| 11,277,416 B2 | 3/2022 | Ray et al. |
| 11,303,651 B1 | 4/2022 | Mouleeswaran et al. |
| 11,410,420 B1 | 8/2022 | Roy et al. |
| 2002/0055820 A1 | 5/2002 | Scannell |
| 2003/0200293 A1 | 10/2003 | Fearn et al. |
| 2004/0002961 A1* | 1/2004 | Dettinger ......... G06F 16/24568 |
| 2004/0205397 A1 | 10/2004 | Rajiv et al. |
| 2004/0205398 A1 | 10/2004 | Osborn et al. |
| 2005/0086064 A1 | 4/2005 | Dively et al. |
| 2006/0031076 A1 | 2/2006 | Lei et al. |
| 2006/0064486 A1 | 3/2006 | Baron et al. |
| 2007/0179709 A1 | 8/2007 | Doyle |
| 2007/0192080 A1 | 8/2007 | Carpenter |
| 2007/0226796 A1* | 9/2007 | Gilbert ................. G06F 21/577 |
| | | | 726/25 |
| 2008/0080384 A1 | 4/2008 | Atkins et al. |
| 2008/0126951 A1 | 5/2008 | Sood et al. |
| 2008/0162565 A1 | 7/2008 | Waguet |
| 2009/0064189 A1 | 3/2009 | Cutlip |
| 2010/0030896 A1* | 2/2010 | Chandramouli .. G06F 16/24568 |
| | | | 709/224 |
| 2010/0250111 A1 | 9/2010 | Gutierrez et al. |
| 2011/0022444 A1 | 1/2011 | Fridman et al. |
| 2011/0099632 A1 | 4/2011 | Beck et al. |
| 2011/0181443 A1 | 7/2011 | Gutierrez et al. |
| 2011/0299597 A1 | 12/2011 | Freiburg et al. |
| 2012/0137367 A1* | 5/2012 | Dupont ................. G06F 21/00 |
| | | | 726/25 |
| 2012/0166688 A1 | 6/2012 | Schoning et al. |
| 2013/0021933 A1 | 1/2013 | Kovvali et al. |
| 2013/0290110 A1 | 10/2013 | LuVogt et al. |
| 2013/0290339 A1 | 10/2013 | LuVogt et al. |
| 2013/0290905 A1 | 10/2013 | LuVogt et al. |
| 2013/0333040 A1 | 12/2013 | Diehl et al. |
| 2014/0085107 A1 | 3/2014 | Gutierrez |
| 2014/0201836 A1 | 7/2014 | Amsler |
| 2015/0227582 A1* | 8/2015 | Gu ........................ G06F 16/958 |
| | | | 707/713 |
| 2015/0358790 A1 | 12/2015 | Nasserbakht |
| 2016/0119365 A1 | 4/2016 | Barel |
| 2016/0163186 A1 | 6/2016 | Davidson et al. |
| 2016/0179618 A1 | 6/2016 | Resch et al. |
| 2016/0191351 A1 | 6/2016 | Smith et al. |
| 2016/0210427 A1 | 7/2016 | Mynhier et al. |
| 2016/0246929 A1 | 8/2016 | Zenati et al. |
| 2016/0321574 A1 | 11/2016 | Peterson |
| 2016/0373588 A1 | 12/2016 | Raleigh et al. |
| 2017/0012854 A1 | 1/2017 | Balasubramanian |
| 2017/0078316 A1 | 3/2017 | Liang et al. |
| 2017/0109530 A1 | 4/2017 | Diehl et al. |
| 2017/0214701 A1 | 7/2017 | Hasan |
| 2017/0235848 A1 | 8/2017 | Van Dusen et al. |
| 2017/0264589 A1 | 9/2017 | Hunt et al. |
| 2018/0004943 A1 | 1/2018 | Lukacs |
| 2018/0013768 A1 | 1/2018 | Hunt et al. |
| 2018/0024901 A1 | 1/2018 | Tankersley et al. |
| 2018/0060926 A1 | 3/2018 | Guadagno |
| 2018/0069875 A1 | 3/2018 | Ben Ezra et al. |
| 2018/0091559 A1 | 3/2018 | Luger |
| 2018/0173580 A1 | 6/2018 | Pavlas et al. |
| 2018/0234434 A1 | 8/2018 | Viljoen |
| 2018/0260251 A1 | 9/2018 | Beveridge et al. |
| 2018/0278647 A1 | 9/2018 | Gabaev et al. |
| 2018/0285873 A1 | 10/2018 | Espinoza et al. |
| 2018/0308112 A1 | 10/2018 | Prentice et al. |
| 2018/0329958 A1* | 11/2018 | Choudhury ......... G06F 16/2456 |
| 2018/0367549 A1 | 12/2018 | Jang et al. |
| 2019/0014141 A1 | 1/2019 | Segal et al. |
| 2019/0081983 A1 | 3/2019 | Teal |
| 2019/0108470 A1 | 4/2019 | Jain |
| 2019/0110241 A1 | 4/2019 | Jain |
| 2019/0121979 A1 | 4/2019 | Chari et al. |
| 2019/0130512 A1 | 5/2019 | Kuhn |
| 2019/0164168 A1 | 5/2019 | Sundaramoorthy et al. |
| 2019/0166152 A1 | 5/2019 | Steele et al. |
| 2019/0182269 A1 | 6/2019 | Lee et al. |
| 2019/0190945 A1 | 6/2019 | Jang et al. |
| 2019/0190952 A1 | 6/2019 | Cherry |
| 2019/0222594 A1 | 7/2019 | Davis, III et al. |
| 2019/0229915 A1 | 7/2019 | Digiambattista et al. |
| 2019/0253431 A1 | 8/2019 | Atanda |
| 2019/0260879 A1 | 8/2019 | Raleigh et al. |
| 2019/0287004 A1 | 9/2019 | Bhoj et al. |
| 2019/0340912 A1 | 11/2019 | Sellathamby et al. |
| 2019/0349204 A1 | 11/2019 | Enke et al. |
| 2019/0370146 A1 | 12/2019 | Babu et al. |
| 2020/0012239 A1 | 1/2020 | Yamamoto |
| 2020/0036603 A1 | 1/2020 | Nieves |
| 2020/0057953 A1 | 2/2020 | Livny et al. |
| 2020/0135311 A1 | 4/2020 | Mairs |
| 2020/0145449 A1 | 5/2020 | Segal et al. |
| 2020/0193018 A1 | 6/2020 | Van Dyke |
| 2020/0220754 A1 | 7/2020 | Hunter et al. |
| 2020/0244680 A1* | 7/2020 | Brandel ................ G06F 16/245 |
| 2020/0259852 A1 | 8/2020 | Wolff et al. |
| 2020/0274894 A1 | 8/2020 | Argoeti et al. |
| 2020/0285737 A1 | 9/2020 | Kraus et al. |
| 2020/0296124 A1 | 9/2020 | Pratt et al. |
| 2020/0321122 A1 | 10/2020 | Neumann |
| 2020/0371512 A1 | 11/2020 | Srinivasamurthy et al. |
| 2021/0042408 A1 | 2/2021 | Van Dyke et al. |
| 2021/0042854 A1 | 2/2021 | Hazy et al. |
| 2021/0055927 A1 | 2/2021 | Sarukkai et al. |
| 2021/0075686 A1 | 3/2021 | Smith et al. |
| 2021/0081539 A1 | 3/2021 | Karin et al. |
| 2021/0083891 A1 | 3/2021 | Anchondo |
| 2021/0117251 A1 | 4/2021 | Cristofi et al. |
| 2021/0182387 A1 | 6/2021 | Zhu et al. |
| 2021/0211438 A1 | 7/2021 | Trim et al. |
| 2021/0248443 A1 | 8/2021 | Shu et al. |
| 2021/0266333 A1 | 8/2021 | Wright et al. |
| 2021/0288981 A1 | 9/2021 | Numainville et al. |
| 2021/0326452 A1 | 10/2021 | Diehl et al. |
| 2021/0326453 A1 | 10/2021 | Diehl et al. |
| 2021/0329012 A1 | 10/2021 | Diehl et al. |
| 2021/0329013 A1 | 10/2021 | Diehl et al. |
| 2021/0329014 A1 | 10/2021 | Diehl et al. |
| 2021/0334369 A1 | 10/2021 | Keiter et al. |
| 2021/0352099 A1* | 11/2021 | Rogers ................. G06F 16/252 |
| 2021/0406041 A1 | 12/2021 | Saraiya et al. |
| 2022/0012148 A1 | 1/2022 | Plum et al. |
| 2022/0067957 A1 | 3/2022 | Majumder |
| 2022/0136857 A1 | 5/2022 | Pompili et al. |
| 2022/0222686 A1 | 7/2022 | Mihara |
| 2023/0046839 A1 | 2/2023 | Raleigh |
| 2023/0164151 A1 | 5/2023 | Diehl |

FOREIGN PATENT DOCUMENTS

| | | |
|---|---|---|
| WO | WO2013184281 A1 | 12/2013 |
| WO | WO2016049319 A1 | 3/2016 |

OTHER PUBLICATIONS

The Extended European Search Report dated Aug. 19, 20201 for European Patent Application No. 21164747.4, 9 pages.
The Extended European Search Report dated Aug. 24, 2021 for European Patent Application No. 21164749.0, 9 pages.
The Extended European Search Report dated Aug. 27, 2021 for European Patent Application No. 21164750.8, 8 pages.
The Extended European Search Report dated Aug. 31, 2021 for European Patent Application No. 21164751.6, 8 pages.

(56) References Cited

OTHER PUBLICATIONS

Extended European Search Report dated Sep. 6, 2021 for European Patent Application No. 21164753.2, 8 pages.
Office Action for U.S. Appl. No. 16/849,411, dated Oct. 6, 2021, Diehl, "Distributed Digital Security System", 9 Pages.
Office Action for U.S. Appl. No. 16/849,496, dated Dec. 24, 2021, Diehl, "Distributed Digital Security System", 8 Pages.
Office Action for U.S. Appl. No. 16/849,543, dated Feb. 16, 2022, Diehl, "Distributed Digital Security System", 29 Pages.
Office Action for U.S. Appl. No. 16/849,496, dated Sep. 30, 2022, Diehl, "Distributed Digital Security System", 8 pages.
Office Action for U.S. Appl. No. 16/849,579, dated Nov. 14, 2022, Diehl, "Distributed Digital Security System", 23 pages.
Office Action for U.S. Appl. No. 16/849,579, dated Apr. 26, 2022, Diehl, "Distributed Digital Security System", 20 pages.
Office Action for U.S. Appl. 16/849,543, dated Aug. 26, 2022, Diehl, "Distributed Digital Security System", 32 Pages.

* cited by examiner

| CID 302 | AID 304 | Source Vertex Type 306 | Source Key 308 | Edge Type 310 | Timestamp 312 | Destination Vertex Type 314 | Destination Key 316 | Checksum 318 |
|---|---|---|---|---|---|---|---|---|

REAL-TIME STREAMING GRAPH QUERIES

TECHNICAL FIELD

The present disclosure relates to digital security systems, particularly with respect to executing queries against a graph that represents events detected on a computing system.

BACKGROUND

Digital security exploits that steal or destroy resources, data, and private information on computing devices are an increasing problem. Governments and businesses devote significant resources to preventing intrusions and thefts related to such digital security exploits. Some of the threats posed by security exploits are of such significance that they are described as cyber terrorism or industrial espionage.

Security threats come in many forms, including computer viruses, worms, trojan horses, spyware, keystroke loggers, adware, and rootkits. Such security threats may be delivered in or through a variety of mechanisms, such as spearfish emails, clickable links, documents, executables, or archives. Other types of security threats may be posed by malicious users who gain access to a computer system and attempt to access, modify, or delete information without authorization.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
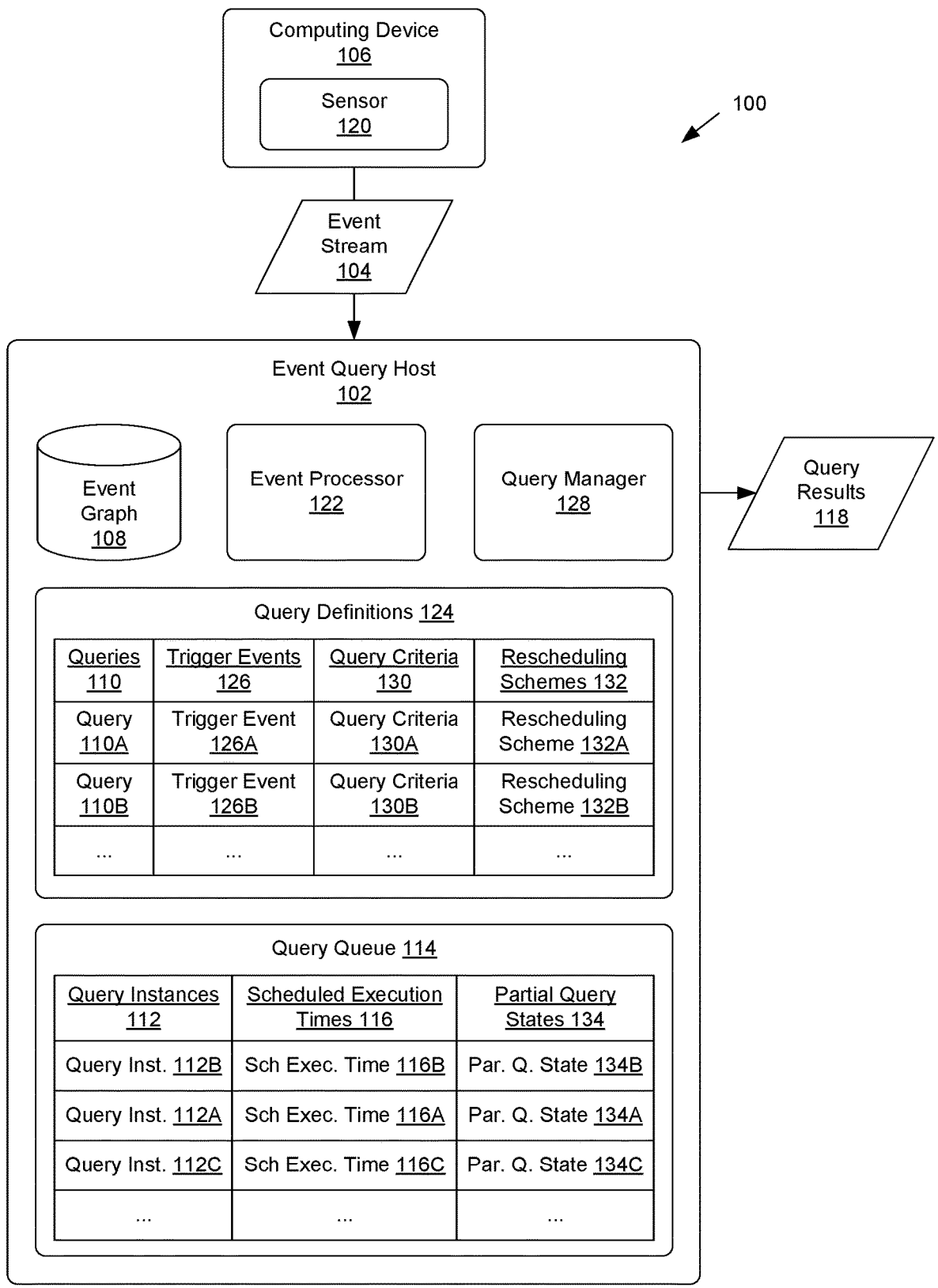
FIG. 1 shows an example of a system in which an event query host can process an event stream associated with at least one computing device.

Events can occur on computer systems that may be indicative of security threats to those systems. Although in some cases a single event may be enough to trigger detection of a security threat, in other cases individual events may be innocuous on their own but be indicative of a security threat when considered in combination. For instance, opening a file, copying file contents, and opening a network connection to an Internet Protocol (IP) address may each, on their own, be normal and/or routine events on a computing device. However, the particular combination of those events may indicate that a process executing on the computing device is attempting to steal information from a file and send it to a server.

Digital security systems have accordingly been developed that can observe events that occur on computing devices, and that can use event data about one or more event occurrences to detect and/or analyze security threats. However, many such digital security systems are limited in some ways.

For example, some digital security systems receive event data reported by local security agents executing on computing devices, but store event data associated with numerous computing devices at a cloud server or other centralized repository. Although such a centralized repository of event data may have the storage space to store a large amount of event data, it can be difficult and/or inefficient for other elements of the digital security system to interact with the event data in the centralized repository. For instance, an event analysis system may be configured to evaluate received event data to determine whether the event data matches patterns associated with malicious behavior. However, the event analysis system may have to use an application programming interface (API) to submit a query over a network to the separate centralized repository, and wait for the centralized repository to return a response to that query over the network. Such network-based interactions can introduce latencies, and thereby delay the event analysis system from determining that patterns of malicious behavior have occurred on a computing device. Such delays can be significant for digital security systems, as malicious processes may be able to continue operating and attack computing devices until digital security systems identify corresponding patterns of malicious behavior.

As another example, some digital security systems may execute a set of standing queries against a collection of received event data on a regular basis, such as every minute. However, if a pattern of malicious behavior includes a series of multiple events that may occur over a period of five minutes, it can be inefficient for a digital security system to attempt to find that pattern in received event data once per minute. For example, the first four attempts at executing a query for that pattern (executed at a first minute mark, a second minute mark, a third minute mark, and a fourth minute mark) may be unlikely to succeed, if the full pattern is generally not found for five minutes. In this situation, executing a particular query every minute, even though multiple initial attempts are unlikely to succeed, can waste processing cycles, increase load on a database that stores the event data, delay execution of other queries that may be more likely to succeed, and/or cause other inefficiencies.

In some digital security systems, it may also be difficult to determine which queries to execute, and at which times. For instance, a security system may be configured to execute a set of queries against a database of event data. The security system may not be able to execute all of the queries concurrently, and thus may need to select which query to execute when resources are available to execute a new query. However, many security systems do not execute queries in an order determined based at least in part on event data that has actually been received. For instance, some security system may execute queries from the set of queries in a random order, in a round-robin order, in a predefined order, or in other orders, without selecting those queries based on which ones may be most likely to succeed. As an example, a security system may, based on a round-robin execution order, execute a query for an external network connection event even though the security system has not received event data indicating that a computing device recently initiated an external network connection. This query may accordingly be unlikely to succeed.

Additionally, some digital security systems may repeat entire queries if the queries are not initially successful. For instance, if a full pattern of events associated with a query is not found during an initial execution of the query, some digital security systems may search again for the full pattern of events during the next execution of the query, even if a portion of the pattern had been found during the initial query. Accordingly, these digital security systems may have to keep data associated with the partial pattern that has already been found so that it can be found again, and it may take longer and/or use additional computing resources to search for the entire pattern again during the next execution of the query.

Described herein are systems and methods associated with a digital security system that can address these and other deficiencies of digital security systems. For example, an event query host in the digital security system can store, in local memory, an event graph that represents events and relationships between events. Accordingly, information in the event graph can be locally-accessible by elements of the event query host. An event processor of the event query host can add representations of events that occurred on a computing device to the local event, substantially in real-time as event information is received by the event query host. If an event added to the event graph matches a trigger event for a query, the event processor can add a corresponding query instance to a query queue, to be executed at a scheduled execution time. Accordingly, query instances can be scheduled and executed at least in part due to corresponding event data that has actually been received by the event query host. Additionally, at the scheduled execution time for a query instance, a query manager can search the local event graph for a corresponding event pattern. If a matching event pattern is not found in the local event graph, the query manager can reschedule the query instance in the query queue to be re-attempted at a particular later point in time when a matching event pattern is more likely to be in the event graph. The query manager may also store a partial query state associated with any matching portions of the event pattern that were found in the event graph, such that the query manager can avoid searching for the full event pattern again during the next execution of the query instance.

FIG. 1 shows an example 100 of a system in which an event query host 102 can process an event stream 104 associated with at least one computing device 106. The event stream 104 can include instances of event data associated with discrete events that occurred on the computing device 106. The event query host 102 can generate and maintain an event graph 108 based on the event stream 104. The event graph 108 can include vertices that represent events that occurred on the computing device 106, and edges between the vertices that represent relationships between the events. The event query host 102 can manage a set of queries 110, such as query 110A and query 110B shown in FIG. 1. The event query host 102 may also execute individual query instances 112, corresponding to one or more of the queries 110, against the event graph 108. The query instances 112 may be ordered within a query queue 114 according to scheduled execution times 116. The event query host 102 may accordingly execute individual query instances 112 in the query queue 114 at the scheduled execution times 116.

If the event query host 102 finds matches for the query instances 112 in the event graph 108, the event query host 102 can output corresponding query results 118. If the event query host 102 does not find matches for a query instance in the event graph 108, the event query host 102 may reschedule the query instance within the query queue 114 based on a later scheduled execution time.

The computing device 106 may have a sensor 120 that is configured to detect the occurrence of events on the computing device 106. For example, the sensor 120 may be a security agent installed on the computing device 106 that is configured to monitor operations of the computing device 106, such as operations executed by an operating system and/or applications. An example of such a security agent is described in U.S. patent application Ser. No. 13/492,672, entitled "Kernel-Level Security Agent" and filed on Jun. 8, 2012, which issued as U.S. Pat. No. 9,043,903 on May 26, 2015, and which is hereby incorporated by reference. The sensor 120 may be configured to detect when certain types of events occur on the computing device 106. The sensor 120 may also be configured to transmit the event stream 104, over the Internet and/or other data networks, to a remote security system that includes the event query host 102.

The event stream 104 may indicate information about multiple events on the computing device 106 that were detected by the sensor 120. Such events can include events and behaviors associated with software operations on the computing device 106, such as events associated with Internet Protocol (IP) connections, other network connections, Domain Name System (DNS) requests, operating system functions, file operations, registry changes, process executions, and/or any other type of operation. By way of non-limiting examples, an event may be that a process opened a file, that a process initiated a DNS request, that a process opened an outbound connection to a certain IP address, that there was an inbound IP connection, that values in an operating system registry were changed, or any other type of event. In some examples, events may also, or alternatively, be associated with hardware events or behaviors, such as virtual or physical hardware configuration changes or other hardware-based operations. By way of non-limiting examples, an event may be that a Universal Serial Bus (USB) memory stick or other USB device was inserted or removed, that a network cable was plugged in or unplugged, that a cabinet door or other component of the computing device 106 was opened or closed, or any other physical or hardware-related event.

The event query host 102 can be part of a security system, such as a system associated with a security service that operates remotely from the computing device 106. For example, the event query host 102 can be, or execute on, a computing system different from the computing device 106, such as the computing system described below with respect to FIG. 9. In some examples, the security system that includes the event query host 102 may process event streams associated with multiple computing devices, as will be discussed further below with respect to FIG. 5. The event graph 108, generated from such event streams, may be associated with a single computing device or a group of computing devices. One or more event query hosts in the security system can use queries 110 to determine when events or patterns of events, associated with behavior of interest, have occurred on one or more of the computing devices. In some examples, the behavior of interest associated with a query may be malicious behavior, such as behavior that may occur when malware is executing on the computing device 106, when the computing device 106 is under attack by an adversary who is attempting to access or modify data on the computing device 106 without authorization, or when the computing device 106 is subject to any other security threat.

If the event query host 102 detects an occurrence of such an event or pattern of events, based on executing a query against the event graph 108 representing events that occurred on one or more computing devices, the event query host may output corresponding query results 118. For instance, the query results 118 may indicate that a pattern of events associated with malware, other malicious behavior, or any other behavior of interest has occurred on the computing device 106. Based on query results 118 generated by the event query host 102, the security system may log instances of the behavior of interest, provide the query results 118 and/or corresponding event data to data analysts or event analysis systems within the security system, provide the query results 118 and/or corresponding instructions to the sensor 120, and/or take other actions in response to the query results 118. For example, if the query results 118 indicate that the computing device 106 is under attack by a malicious process executing on the computing device 106, the security system may instruct the sensor 120 to block or terminate the malicious process, or to provide further information in the event stream 104 about ongoing activity of the malicious process.

The event query host 102 can have an event processor 122 that is configured to modify the event graph 108 to add information about individual events that the event processor 122 identifies within the event stream 104, substantially in real-time as information about events are received in the event stream 104. Accordingly, the event graph 108 can be updated, substantially continuously and in real-time, to include information about a set of events that occurred on the computing device 106. For example, when the event processor 122 identifies an occurrence of new event on the computing device 106 based on new information received in the event stream 104, the event processor 122 may add a new vertex to the event graph 108 that represents the new event. In some cases, the event processor 122 may also add or edit one or more edges in the event graph 108 that link the new vertex to one or more other vertices in the event graph 108, based on relationships determined by the event processor 122 between the events represented by the vertices. Data associated with the event graph 108 may be stored in a database at the event query host 102, for example as discussed below with respect to FIG. 2 and FIG. 3.

In some examples, the event processor 122 may be configured with a set of event definitions. The event definitions may define data formats that the event processor 122 can use to identify and/or interpret event data within the event stream 104. For example, the sensor 120 may be configured to use a particular data format to provide event data about a particular type of event within the event stream 104, and the event processor 122 may also be configured to interpret the event data according to that particular data format. In some examples, the event definitions used by the event processor 122 and/or the sensor 120 may be changed or reconfigured over time. For example, event definitions associated with various event types can be changed or added to cause the sensor 120 to capture data about new types of events or to capture new or different data about known types of events, and the event processor 122 can accordingly also use such event definitions to interpret corresponding event data provided by the sensor 120 in the event stream 104.

In some examples, the event definitions used by the event processor 122 and/or the sensor 120 may be ontological definitions managed by an ontology service within the security service, as described in U.S. patent application Ser. No. 16/849,543, entitled "Distributed Digital Security System" and filed on Apr. 15, 2020, which is hereby incorporated by reference. For example, the event query host 102 may have an ontology manager (not shown) that is configured to receive ontological definition configurations from the ontology service, and provide ontological definitions of events to the event processor 122.

The event query host 102 may also be configured with a set of query definitions 124 associated with queries 110. The query definitions 124 may be configuration files, computer-executable instructions, and/or other data that indicate attributes of queries 110. In some examples, the event query host 102 may store the query definitions 124 in the same database as the event graph 108. In other examples, the event query host 102 may store the query definitions 124 in a different database or data structure.

The event query host 102 may also maintain the query queue 114, which can include an ordered representation of query instances 112. The query queue 114 may be ordered or sorted, for example, based on scheduled execution times 116 associated with the query instances 112. In some examples, the event query host 102 may store data associated with the query queue 114 in the same database as the event graph 108 and/or the query definitions 124. In other examples, the event query host 102 may store the data associated with the query queue 114 in a different database or data structure.

Each query instance in the query queue 114 may be associated with a corresponding query, and have the attributes of that query defined by the query definitions 124. For example, the query queue 114 may include any number of distinct query instances 112 corresponding to query 110A, as well as any number of distinct query instances 112 corresponding to query 110B. Query instances 112 corresponding to query 110A may be distinct instances of query 110A, and/or have the attributes of query 110A. Similarly, query instances 112 corresponding to query 110B may be distinct instances of query 110B, and/or have the attributes of query 110B.

At any point in time, the query queue 114 may or may not include query instances 112 that correspond to all of the queries 110 managed by the event query host 102. For example, the query queue 114 may not include a query instance that corresponds to query 110A at a first point in time, but the query queue 114 may include one or more query instances 112 that correspond to query 110A at a second point in time.

The queries 110 may be associated with corresponding trigger events 126. For example, query 110A may be associated with trigger event 126A, while query 110B may be associated with trigger event 126B. The trigger event for a query may be a particular type of event, that if detected in the event stream 104, may indicate that the event query host 102 should execute an instance of the query against the event graph 108.

Accordingly, the event processor 122 may be configured to detect trigger events 126, associated with the queries 110, in the incoming event stream 104. If the event processor 122 detects a trigger event associated with a particular query in the event stream 104, the event processor 122 can add a new query instance to the query queue 114 that corresponds to that particular query. For example, as the event processor 122 is identifying events in the event stream 104 in order to add information associated with such events to the event graph 108, the event processor 122 may determine that one of the events is the trigger event 126A for query 110A. The event processor 122 may add information associated with the event to the event graph 108, and also add a new query instance to the query queue 114 that corresponds with query 110A.

In some examples, a trigger event for a query may be associated with an event type, as well as one of more filters that, if satisfied, indicate that a corresponding query instance should be added to the query queue 114. Filters may indicate a minimum version requirement for an event, a requirement that a particular data field associated with the event includes a particular value, a requirement that an identifier of the event be included on a whitelist stored by the event query host, and/or any other requirement. The event processor 122 may accordingly identify one or more candidate events in the event stream 104 that may be a trigger event for a query, and then use one or more filters associated with the query to determine if the candidate events are actually trigger events 126 for the query. If such an event satisfies the filters associated with a query, and is therefore a trigger event associated with the query, the event processor may add a corresponding query instance to the query queue 114.

As a non-limiting example, a trigger event for a query may have a DNS lookup event type, but be associated with one or more filters for DNS lookups of particular domain names, or that return specific IP addresses or an IP address in a particular range of IP addresses. The event processor 122 may accordingly identify all DNS lookup events in the event stream 104 as potential trigger events, and use corresponding filters to determine if any of those DNS lookup events satisfy the filters and are to be treated as actual trigger events 126.

In some examples, the event processor 122 may be configured to perform de-duplication operations on received event data. For example, multiple instances of the same event data may arrive at different times in the event stream 104. The event processor 122 may be configured to determine whether an instance of received event data 122 has already been added to the event graph 108 and/or matched a trigger event such that the instance of event data already prompted the event processor 122 to add a query instance to the query queue 114. In these examples, if the event processor 122 determines that an instance of received event data is a duplicate of a previously-received instance of event data, the event processor 122 may avoid adding another representation of the duplicated instance of event data to the event graph 108, and may also avoid adding another query instance to the query queue 114 based on the duplicated instance of event data.

In some examples, the event processor 122 may add new query instances 112 to the query queue 114 with scheduled execution times 116 that are selected based on a default scheduling configuration. For example, the event processor 122 may be configured to add a new query instance to the end of the query queue 114 by assigning the new query instance a scheduled execution time that is at least a predefined amount of time later than the scheduled execution time of the last query instance already present within the query queue 114.

As a non-limiting example, the query queue 114 may contain query instance 112A and query instance 112B. The query instance 112A may be the lowest-priority query instance in the query queue 114, because the scheduled execution time 116A of query instance 112A is later than the scheduled execution time 116B of query instance 112B. The event processor 122 may be configured to add new query instance 112C at the end of the query queue 114 with a scheduled execution time 116C that is later than scheduled execution time 116A of query instance 112A.

In other examples, the event processor 122 may be configured to assign a new query instance a scheduled execution time that causes the new query instance to be placed at the front or middle of the query queue 114. As a non-limiting example, if a particular query has a high importance or priority level, and the event processor 122 detects a trigger event associated with that query, the event processor 122 may add a new corresponding query instance to the query queue 114 with a scheduled execution time that causes the new query instance to be executed before other query instances 112 already present in the query queue 114.

Some or all of the queries 110 may be standing queries that can lead to corresponding query instances 112 being added to the query queue 114 at any time. However, in some examples, the query definitions 124 may indicate that one or more of the queries 110 are ephemeral queries. Ephemeral queries may be associated with specific periods of time, specific sensors, specific events in the event stream, or other specific conditions. As an example, an ephemeral query may indicate that all of the event data from a particular sensor, such as sensor 120, should be examined using specific query criteria 130 for a period of ten minutes. Accordingly, corresponding query instances may be active in the query queue 114 for up to ten minutes. As another example, an ephemeral query may indicate that if a particular process is launched on the computing device 106, all related events associated with that particular process and/or any of its child processes should be monitored according to specific query criteria 130 until the particular process terminates. Accordingly, corresponding query instances may be active in the query queue 114 until event data is received in the event stream indicating that the particular process has terminated.

In some examples, the event query host 102 may be associated with a user interface and/or API that allows users to view query definitions 124, edit query definitions 124, delete query definitions 124, and/or add new query definitions 124. For example, a user may generate a definition for a new type of query, and use the API to submit the new query definition to the event query host 102 as a new standing query or an ephemeral query. In some examples, the user interface and/or API may be associated with a centralized computing device or service that can manage query definitions 124 and periodically provide updates to the query definitions 124 to the event query host 102 and/or other event query hosts. In other examples in which multiple event query hosts are associated with each other, as discussed below with respect to FIG. 5, updates to query definitions 124 made locally at the event query host 102 may be propagated to the other event query hosts over a network connection. The centralized computing device, and/or each event query host, may have a database that stores information about changes to the query definitions 124 over time, for example for backup and/or auditing purposes.

The event query host 102 can have a query manager 128 that is configured to manage and execute query instances 112 in the query queue 114, based on corresponding scheduled execution times 116. The query queue 114 may be ordered based on the scheduled execution times 116 of the query instances 112, such that the query manager 128 can attempt to process the highest-priority query instance in the query queue 114 at the scheduled execution time of that query instance. For example, query instance 112B shown in FIG. 1 may be the highest-priority query instance in the query queue 114, if the scheduled execution time 116B is earlier than the scheduled execution times 116 of other query instances 112 in the query queue 114.

The queries 110, and thus corresponding query instances 112 in the query queue 114, may be associated with query criteria 130. For example, query 110A may be associated with query criteria 130A, while query 110B may be associated with query criteria 130B. Query criteria 130 for the queries 110 may indicate that the queries 110 are filter queries, metadata queries, or pattern queries.

Filter queries may indicate a particular event type, and determine if any detected events of that event type represented in the event graph 108 match one or more filters. For example, a filter query may be associated with DNS lookup events, and indicate that query results 118 should be emitted if a DNS lookup event represented in the event graph 108 is associated with a particular IP address range defined by a filter.

Metadata queries may indicate a particular event type, and query one or more types of metadata associated with the event. For instance, a metadata query may identify an event type that may be indicative of an attack or compromise on the computing device 106. If that event type is found in the event graph 108, the metadata query may indicate that related contextual data, such as information about parent processes or other related events, should be collected and emitted as query results 118 if such information is present within the event graph 108.

Pattern queries may indicate a pattern of one or more events that are relevant to the queries, such as a pattern of events that may be associated with malware, other malicious behavior, or any other behavior of interest. For example, query criteria 130 for a query may indicate a type of each event in the pattern, relationships between the events in the pattern, timeframes associated with relationships between the events in the pattern, and/or any other information about the pattern of events. The query may accordingly be satisfied if the pattern of events is found within the event graph 108, and corresponding query results 118 can be emitted.

Figure 4:
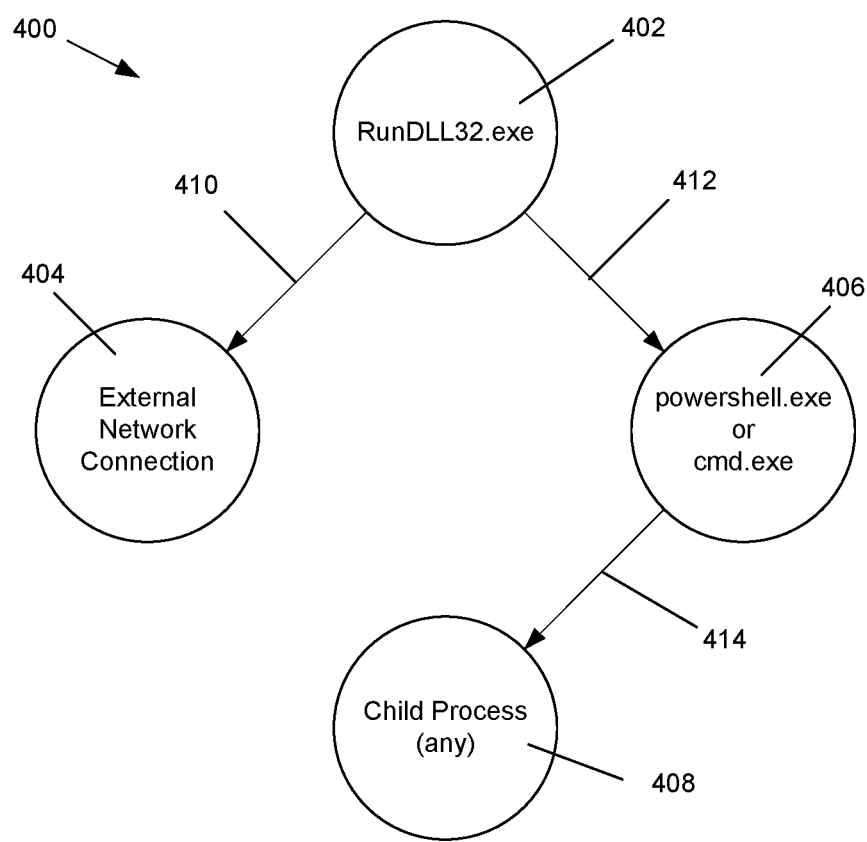
FIG. 4 shows an example of query criteria for a query that can be executed against the event graph.

In some examples, the query criteria 130 for a query may be a pattern of one or more events that is expressed using a graph representation that represents the events as vertices, and uses edges between the vertices to represent relationships between the events. An example of a graph for such an event pattern for query criteria 130 is shown in FIG. 4, and is discussed further below with respect to that figure. A query may accordingly be satisfied if at least one sub-graph that matches the graph associated with the query criteria 130 for the query is found within the event graph 108.

At the scheduled execution time of a query instance in the query queue 114, the query manager 128 may determine the query criteria 130 of that query instance. The query manager 128 may also attempt to find a sub-graph, within the event graph 108, that matches a pattern indicated by the query criteria 130. For example, the query manager 128 may use graph isomorphism principles and/or perform graph traversal operations to search for one or more sub-graphs, within the event graph 108, that match a graph of events associated with a query instance.

If the query manager 128 executes a query instance in the query queue 114, and finds a sub-graph within the event graph 108 that matches the query criteria 130 of that query instance, the query instance may be satisfied. The query manager 128 may remove the query instance from the query queue 114, and cause the event query host 102 to generate corresponding query results 118.

However, if the query manager 128 executes a query instance in the query queue 114, but does not find a sub-graph within the event graph 108 that matches the query criteria 130 of that query instance, the query manager 128 may reschedule the query instance in the query queue 114. For example, the query manager 128 may edit the scheduled execution time of the query instance in the query queue 114, such that the query instance is lowered in the query queue 114 and is scheduled to be retried at a later time.

As a non-limiting example, the query manager 128 may have previously executed query instance 112A, but not found a matching sub-graph in the event graph 108. The query manager 128 may have changed the scheduled execution time 116A of query instance 112A to a time that is later than the scheduled execution time of 116B of query instance 112B, in order to reschedule the next execution of query instance 112A after the next execution of query instance 112B.

The queries 110, and thus corresponding query instances 112 in the query queue 114, may be associated with rescheduling schemes 132. For example, query 110A may be associated with rescheduling scheme 132A, while query 110B may be associated with rescheduling scheme 132B. The rescheduling scheme for a query may indicate a wait time, or other rescheduling information, which the query manager 128 can use to determine a new scheduled execution time for a query instance corresponding to that query. The query manager 128 may accordingly re-order the query queue 114 based on a new scheduled execution time for a query instance determined based on a rescheduling scheme. For example, if the query manager 128 executes a query instance, but the query instance is not satisfied, the query manager 128 may reschedule the query instance in the query queue 114 to be executed again three minutes later, based on a rescheduling scheme that indicates a three-minute wait time. As a non-limiting example, query instance 112A shown in FIG. 1 may have been rescheduled after an earlier attempt, such that query instance 112B is a higher priority, and has an earlier scheduled execution time 116A, in the query queue 114 than query instance 112A.

In some examples, a rescheduling scheme for a query may indicate that each corresponding query instance within the query queue 114 should be retried on a regular basis after a consistent wait time if the query instance has not yet been satisfied, such as every minute, every two minutes, or on any other frequency. In other examples, a rescheduling scheme for a query may indicate that each corresponding query instance in the query queue 114 should be retried after varying wait times based on an exponential backoff scheme if the query instance has not yet been satisfied, such as a first retry after one minute, a second retry two minutes later, a third retry four minutes later, a fourth retry eight minutes later, and so on.

However, in still other examples, a rescheduling scheme for a query may indicate a wait time, or other rescheduling information, that has been determined based on historical information about prior corresponding query instances. For instance, the event query host 102 may use statistical analysis operations to determine averages, percentiles, or other statistical metrics associated with times it has historically taken to find sub-graphs that satisfy query instances. Such statistical metrics may be used to determine scheduled execution times 116 that can be used to schedule and/or reschedule query instances 112. In some examples, the event query host 102 may use artificial intelligence or machine learning techniques to determine how long to wait before a next execution of a query instance that has not yet been satisfied. For instance, a machine learning model may be trained, based on historical information about prior query instances, to predict optimal scheduled execution times 116 that can be used to schedule and/or reschedule query instances 112.

As a non-limiting example, a rescheduling scheme for a query may indicate that, on average, it takes five minutes and thirty seconds for a sub-graph that matches the query criteria of the query to be found in the event graph 108. Accordingly, the rescheduling scheme for the query may indicate that an instance of that query should be scheduled for five minutes and thirty seconds after the trigger event was identified, be rescheduled after an initially unsuccessful first execution attempt for a time that is five minutes and thirty seconds after the trigger event was identified, or be rescheduled for five minutes and thirty seconds after the unsuccessful first execution attempt.

In some examples, rescheduling schemes 132 for the queries 110 may initially be based on a consistent wait time, an exponential backoff scheme, or any other predefined pattern. However, as actual corresponding query instances 112 are attempted over time, and the event query host 102 collects corresponding historical data about those query instances 112, the event query host 102 may dynamically adjust the rescheduling schemes 132 for the queries 110.

As a non-limiting example, the rescheduling scheme 132A may initially cause the query manager 128 to execute instance of query 110A every minute until a matching sub-graph is found in the event graph 108. However, after fifty, one hundred, or any other number of instances of query 110A have completed, the query manager 128 or another element of the event query host 102 may determine that, for 99% of those instances, a matching sub-graph was found within four minutes. Accordingly, the event query host 102 may adjust the rescheduling scheme 132A so that future instances of query 110A may be scheduled and/or rescheduled to be executed four minutes after trigger event 126A was identified. Accordingly, the query manager 128 may wait four minutes to attempt and/or reattempt an instance of query 110A, rather than attempting the instance of query 110A every minute even though attempts during the first minute, second minute, and third minute may be unlikely to succeed. Accordingly, because the rescheduling schemes 132 can be dynamically adjusted and used to determine scheduled execution times 116 for query instances 112 that may be the most likely to succeed, the rescheduling schemes 132 can reduce the number of graph traversal operations performed by the query manager 128, and also reduce the load on the database that stores the event graph 108.

In some examples, the query manager 128 may vary the actual times used to determine scheduled execution times 116, in order to obtain additional historical data about how long query instances 112 take to succeed and to further refine and adjust the rescheduling schemes 132 over time. For example, the query manager 128 may determine, based on at least a threshold number of earlier instances of query 110B, that on average it takes five minutes for instances of query 110B to succeed. However, rather than rescheduling every subsequent unsuccessful instance of query 110B within the query queue 114 to be re-executed after a wait time of five minutes, the query manager 128 may schedule some unsuccessful instances of query 110B to be re-executed at varying wait times within a four to six-minute time window. Attempting to re-execute various instances of query 110B after waiting four minutes, five minutes, six minutes, or other periods of time within the four to six-minute time window, instead of rescheduling only based on the initially-determined average of five minutes, can provide additional historical data that may show that the average success time has decreased, over time, to four and a half minutes. The query manager 128 may accordingly refine the rescheduling schemes 132 associated with queries 110 over time, based at least in part on tracking success times associated with query instances 112 and rescheduling unsuccessful query instances 112 based on varying wait times within time windows associated with the rescheduling schemes 132.

In addition to scheduled execution times 116, the query instances 112 in the query queue 114 may be associated with partial query states 134. As discussed above, the query manager 128 may execute a query instance at a corresponding scheduled execution time. The query manager 128 may identify query criteria 130 associated with the query instance, such as a graph that uses vertices and edges to represent a pattern of events and relationships between the events. The query manager 128 can accordingly attempt to find a sub-graph, within the event graph 108, that matches the graph associated with the query instance. If the query manager 128 does not find a full matching sub-graph within the event graph 108, but does find one or more matching portions of the sub-graph within the event graph 108, the query manager 128 may store data associated with the matching portions of the sub-graph as a partial query state associated with the query instance. In some examples, the partial query states 134 may include copies of data associated with corresponding vertices and/or edges in the event graph 108, such as copies of database data shown and described below with respect to FIG. 3.

Although the partial query state can be stored in association with the query instance, the query instance may not yet be successful because the full query criteria 130 associated with the query instance has not yet been found in the event graph 108. The query manager 128 may accordingly reschedule the unsuccessful query instance in the query queue 114 with a later scheduled execution time, as discussed above. However, during the next execution of the query instance at the later scheduled execution time, the query manager 128 may use the stored partial query state to determine which portions of the query criteria 130 have already been found in the event graph 108. The query manager 128 can accordingly attempt to identify only the remaining portions of the query criteria 130 that have not yet been found in the event graph 108, instead of searching for the entire query criteria 130 in the event graph 108. For instance, the query manager 128 may search for remaining elements of a sub-graph associated with the query instance which, in combination with the stored partial query state, complete the full sub-graph. Accordingly, the partial query states 134 can allow the query manager 128 to pick up where it left off with respect to individual query instances 112 that are attempted more than once.

As a non-limiting example, query criteria 130 for query instance 112A may indicate a specific pattern of six events. Upon a first execution of query instance 112A, the query manager 128 may identify vertices and edges in the event graph 108 may match two of the six events associated with the query criteria 130 for query instance 112A. The query manager 128 may store a partial query state 134A in association with query instance 112A, and change the scheduled execution time 116A of query instance 112A in the query queue 114 so that the query manager 128 will execute query instance 112A again five minutes later. When the query manager 128 executes query instance 112A again five minutes later, the query manager 128 can determine from the stored partial query state 134A that two of the six events associated with the query criteria 130 for query instance 112A were already found in the event graph 108. The query manager 128 can accordingly attempt to find vertices and edges in the event graph 108 that match the remaining four events associated with the query criteria 130 for query instance 112A, rather than searching again for the full pattern of six events.

The partial query states 134 therefore allow the query manager 128 to continue searching for remaining elements of query criteria 130 associated with repeated query instances 112 that have not yet been found in the event graph 108, rather than searching for the full query criteria 130 in part by searching again for elements that have already been found. Accordingly, the query manager 128 can use the partial query states 134 to efficiently search for the remaining elements of query criteria 130, and thereby avoid using processor cycles, memory, and other computing resources to search again for elements of query criteria 130 that have already been found in the event graph 108.

Moreover, the query manager 128 may determine, based in part on the partial query states 134, that the query criteria 130 for a query instance has been found in the event graph 108, even if some of the elements of the query criteria 130 have been deleted from the event graph 108. For example, during a first execution of query instance 112C, the query manager 128 may find a first vertex in the event graph 108 that matches a first portion of the query criteria 130 associated with the query instance 112C, and may store information about the first vertex in the partial query state 134C in association with the query instance 112C. Later, during a subsequent execution of query instance 112C, the query manager 128 may find other vertices and/or edges in the event graph 108 that, in combination with the first vertex, satisfy the query criteria 130 associated with the query instance 112C. In some situations, the first vertex may have been deleted from the event graph 108 after the first execution of query instance, for example based on a timestamp of the first vertex exceeding a time-to-live (TTL) value as will be discussed further below. However, because information associated with the first vertex had been stored in the partial query state 134C associated with query instance 112C, the information in the partial query state 134C may allow the query criteria associated with query instance 112C to be satisfied even if the first vertex is no longer present in the event graph 108.

Stored data associated with the query queue 114, including the partial query states 134, can also be used if the event query host 102 is restarted. For example, if the event query host 102 is upgraded to a new version, is reloaded after an error, or is restarted for any other reason, the query queue 114 can be re-initiated based on stored data about the state of the query queue 114 and the stored partial query states 134. Accordingly, the stored partial query states 134 and/or other stored state data associated with the query queue 114 can allow the query manager 128 can to pick up where it left off after a restart of the event query host 102.

As discussed above, the event processor 122 may be configured to receive the event stream 104, add representations of identified events to the event graph 108, and add new query instances 112 to the query queue 114 if identified events match trigger events 126 for queries 110. The query manager 128 may be configured to execute individual query instances 112 in the query queue 114 at scheduled execution times 116. The query manager 128 can also be configured to emit query results 118 if the query instances 112 are satisfied, or to store partial query states 134 and reschedule the query instances 112 within the query queue 114 if the query instances 112 are not yet satisfied. In some examples, the event processor 122 and the query manager 128 may execute substantially concurrently on a computing system. For instance, the computing system may execute operations of the event processor 122 using a first set of parallel threads, while substantially concurrently executing operations of the query manager 128 using a second set of parallel threads. Accordingly, the event processor 122 may modify the event graph 108 based on new event data substantially in real-time, while the query manager 128 may execute query instances 112 against up-to-date event data in the event graph 108 as soon as the event data is received and added to the event graph 108 by the event processor 122.

Overall, the event query host 102 shown in FIG. 1 can locally store the event graph 108 of event data, such that query instances for event patterns can be locally executed against the event graph 108 without latencies that may be introduced by network-based queries to a remote database of event data. Moreover, the local event graph 108 can be modified substantially in real-time as new event data is received, and such modifications to the local event graph 108 may trigger new query instances 112 to be scheduled that are associated with the newly received event data. Accordingly, because the query instances 112 are scheduled based on recently received event data, such query instances 112 may be more likely to succeed. Additionally, the event query host 102 shown in FIG. 1 can dynamically schedule, and reschedule, individual query instances 112 based on historically-determined metrics about how long it may take to satisfy the query instances 112, and thereby avoid repeated query attempts at earlier times that may be unlikely to succeed. The event query host 102 shown in FIG. 1 can also store partial query states 134 associated with individual query instances 112 that have not yet been satisfied. Accordingly, during a later execution of a rescheduled query instance, a partial query state can be used to identify portions of an event pattern that have already been found in the event graph 108, and a search can be performed for remaining portions of the event pattern instead of a new search for the entire event pattern. The partial query states 134 may accordingly lower search times associated with subsequent executions of query instances 112, reduce load on a database that stores the event graph 108, and query instances 112 to succeed even if matching event data is removed from the event graph 108.

Figures 2, 3:
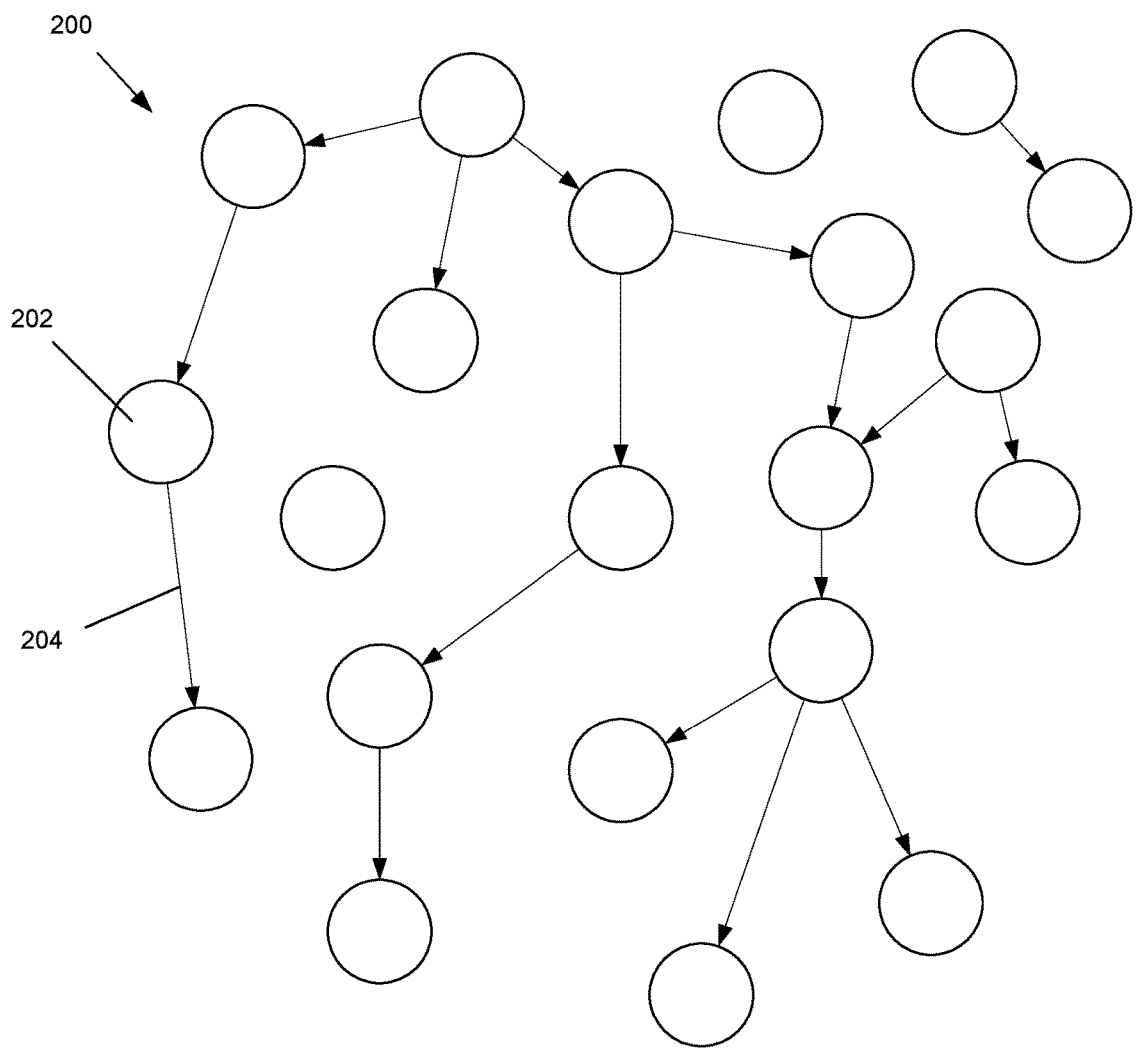
FIG. 2 shows an example of an event graph.
FIG. 3 shows an example of an entity key associated with an entity in an event graph.

FIG. 2 show an example 200 of the event graph 108. The event graph 108 can include vertices 202 that each represent an event that occurred on the computing device 106. The event processor 122 can be configured to, substantially in real-time upon identifying an event in the incoming event stream 104, add a vertex to the event graph 108 that represents information about the event. As a non-limiting example, if the event stream 104 indicates that a "RunDLL32.exe" process was executed on the computing device 106 at a certain time, the event processor 122 can add a vertex to the event graph 108 that identifies the "RunDLL32.exe" process, the time the "RunDLL32.exe" process was executed, and/or any other information about the "RunDLL32.exe" process indicated by the event stream 104.

Vertices 202 may also be connected by edges 204 in the event graph 108. The edges 204 can represent relationships between events represented by the vertices 202. For example, if the event stream 104 indicates that the "RunDLL32.exe" process discussed above spawned a "cmd.exe" process as a child process, the event processor 122 can add a vertex to the event graph 108 that represents the "cmd.exe" process, and add an edge between the vertex associated with the "RunDLL32.exe" process and the edge associated with the "cmd.exe" process. The edge between these two vertices 202 can indicate that the "RunDLL32.exe" process spawned the "cmd.exe" process.

In some examples, the event graph 108 can be a directed graph. For instance, an edge, between a first vertex representing a parent process and a second vertex representing a child process, can be a directional edge that points from the first vertex to the second vertex to represent the parent-child relationship between the processes.

Data defining entities within the event graph 108, such as the vertices 202 and the edges 204, can be stored in a database. For example, data associated with the event graph 108 may be stored in "RocksDB" database, or other type of database. The database may store key-value data for each entity, and information about different entities in the event graph 108 can be stored in the database using an adjacently list graph representation. An example of data for a particular entity of the event graph 108 is shown in FIG. 3, and is discussed below with respect to that figure.

In some examples, the database storing the event graph 108 may be in local memory at the event query host 102, rather than being stored on a remote server or in a cloud computing environment. As such, the event processor 122 can add data to the event graph 108 in local memory substantially in real-time as events are identified in the event stream, without transmitting instructions over a data network to add the data to the event graph 108. Similarly, the query manager 128 can execute query instances 112 and perform graph traversal operations on the locally-stored event graph 108, rather than transmitting query instructions over a data network to a remotely-stored event graph 108 and waiting for results to be received over the data network. Accordingly, storing data associated with the event graph 108 in local memory at the event query host 102 can avoid latencies associated with data transmissions over data networks, and thereby can allow the event graph 108 to be updated and searched by elements of the event query host 102 more quickly.

As noted above, information about entities, such as vertices 202 and edges 204, in the event graph can be stored in a database. For example, the database may have an entry associated with each of the entities. Each database entry may include one or more values, including an entity key and/or other values as discussed with respect to FIG. 3.

FIG. 3 shows an example of an entity key 300 associated with an entity in the event graph 108. As described above, data associated with entities in the event graph 108, such as vertices 202 and edges 204, can be stored as entries in a database. Each entry in the database may be associated with an entity key, such as the entity key 300 shown in FIG. 3. The entity keys in the database can uniquely identify each entity in the database. In some examples, the database may sort the entities based on the entity keys. The entity keys may also allow the event processor 122 and/or the query manager 128 to traverse the event graph 108 in part by identifying database entries corresponding to vertices 202 and/or edges 204 of the event graph 108. Each entry may also have data in one or more other fields in addition to the entity key. For example, an entry associated with a DNS lookup event may have additional data fields that indicate a specific domain name, IP address, and/or other information associated with that DNS lookup event.

In some examples, when the event processor 122 identifies an event, or a relationship between events, based on the event stream 104, the event processor 122 may add a corresponding entry to the database. In other examples, when the event processor 122 identifies an event, or a relationship between events, based on the event stream 104, the event processor 122 may determine if the event or relationship is a modification of an event or relationship that is already represented in the event graph. In these examples, the event processor 122 may be configured to modify the existing representation of the event in the database. For instance, a new event may be an indication that a process has terminated. If the launch of that process is represented by an entity in the database, the event processor 122 may modify the existing entity in the database to indicate that the process, launched earlier, has now terminated. However, in other examples, the event processor 122 may be configured to add new entities to the database in association with each new identified event or relationship, even if it is a modification of a previous event or relationship.

The event processor 122 may also fill in fields of each database entry, and/or related entries, including fields of the entity key 300. The entity key 300 may include a set of fields that can hold data such as a customer identifier (CID) 302, an agent identifier (AID) 304, a source vertex type 306, a source key 308, an edge type 310, a timestamp 312, a destination vertex type 314, a destination key 316, and/or a checksum 318.

The CID 302 may indicate a customer number or other identifier associated with the computing device 106. The AID 304 may be a number or other identifier associated with the sensor 120 executing on the computing device 106. For example, a customer associated with the security service may be a company or other organization that has numerous computing devices, each of which execute a different instance of the sensor 120. The set of computing devices associated with the customer may be associated with a common CID, but each of the sensors on those computing devices may have a unique AID. Accordingly, entities in the database that are associated with a specific customer and/or a specific computing device can be identified using the CIDs and/or AIDS of the entity keys.

The source vertex type 306 and the destination vertex type 314, in the entity key 300 for an entity, can indicate event types associated with a source vertex and/or a destination vertex in the event graph 108 that are associated with the entity. The event types may indicate that a source vertex or a destination vertex represents a DNS lookup, a launch of a process on a computing device, an initiation of a network connection, a particular hardware event, and/or any other type of event. The edge type 310 can similarly indicate a type of relationship that may exist between two events, such as that a first process launched a second process as a child process, that a process associated with a first event initiated a second event, or any other relationship between events.

The source key 308 and destination key 316, in the entity key 300 for an entity, can identify specific entities within the database that are associated with the source vertex and/or destination vertex. For example, multiple entities in the database may be associated with a process execution event type, and each may therefore have entities keys with a shared source vertex type. However, each of those entities may have a distinct source key, such that each of the entities can be uniquely identified.

In some examples, the database may use the same entity key format to represent both vertices and edges of the event graph 108. For example, if an entity is an edge (representing a relationship between a source vertex and a destination vertex), the corresponding entity key 300 may have values for the source vertex type 306 and the source key 308, as well as values for the destination vertex type 314 and the destination key 316. Accordingly, the entity key 300 can indicate that the entry is an edge by identifying the source vertex and the destination vertex that are related by the edge. However, if an entity is instead a vertex (representing a particular event), the corresponding entity key 300 may have values for the source vertex type 306 and/or the source key 308, but omit values for the destination vertex type 314 and the destination key 316. The absence of values for the destination vertex type 314 and the destination key 316 can indicate that the entity is a vertex, and is not an edge.

The timestamp 312 may indicate a time associated with the entity. The timestamp 312 may indicate a time when the entity was added to the database, or a time when the entity was last accessed or edited. In some examples, the event processor 122 may fill in the timestamp 312 based on a time reported by the sensor 120 in the event stream 104. For instance, the sensor 120 may report a time at which a process launched on the computing device 106, or a time at which the sensor 120 detected an event, and the event processor 122 may use that reported time as the timestamp 312. In other examples, the event processor 122 may fill in the timestamp 312 based on a time at which the event processor 122 identified the entity within the event stream 104, or a time at which the event processor 122 added the entity to the event graph 108.

The checksum 318 can be a value generated based on one or more elements of the entity key 300 and/or other portions of the entity. The event query host 102 may use the checksum 318 to verify the integrity of the data stored in the entity and/or perform error correction on data stored in the entity. In some examples, the checksum 318 may be a cyclic redundancy check (CRC) or CRC-32 value.

Elements of the event query host 102, such as the event processor 122 and/or query manager 128, may traverse or search the event graph 108 based on entity keys associated with vertices 202 and edges 204. In some examples, elements of the event query host 102 may use partial entity keys to identify one or more specific entities, or types of entities, in the event graph 108. For example, the event query host 102 may search the event graph 108 based on a first key prefix that includes the first three elements of the entity keys (the CID 302, the AID 304, and the source vertex type 306) to locate all vertexes associated with a particular customer, a particular sensor, and a particular event type. The event query host 102 may also search the event graph 108 based on a second key prefix that includes the first four elements of the entity keys (the CID 302, the AID 304, the source vertex type 306, and the source key 308) to locate a specific vertex associated with the source key 308. The event query host 102 may also search the event graph 108 based on a third key prefix that includes the first five elements of the entity keys (the CID 302, the AID 304, the source vertex type 306, the source key 308, and the edge type 310) to locate all of the edges associated with the vertex identified by the source vertex type 306. The event query host 102 may also search the event graph 108 based on a fourth key prefix that includes the first six elements of the entity keys (the CID 302, the AID 304, the source vertex type 306, the source key 308, the edge type 310, and the timestamp 312) to identify all of the edges associated with the vertex identified by the source vertex type 306, arranged in time order. The event query host 102 may similarly search the event graph 108 based on other key prefixes that include larger numbers of elements of the entity keys, and/or other subsets of elements of the entity keys.

The entity keys, and other values, associated with entities of the event graph 108 stored in the database using binary packing. For example, rather than storing entity keys as blobs of data that may be hundreds of bytes, binary packing may allow each entity key to be represented using 72 bytes, or any other number of bytes. The entity keys and values associated with entities may also be compressed by the event query host 102. In some examples, the event query host 102 may use a light compression algorithm to compress data for entities with recent timestamps, but use a heavier compression algorithm to more heavily compress data for older entities with timestamps older than a defined age threshold. Accordingly, older event data that may be less likely to be relevant to a query, and thus may be less likely be accessed by the query manager 128, may be compressed in the event graph 108 more heavily than more recent event data.

In some examples, the event query host 102 may also be configured to delete or expire entities in the event graph 108 after a certain period of time, for instance based on a time-to-live (TTL) period. The event query host 102 may be configured to use the timestamps of entity keys to determine which entities can be deleted. As a non-limiting example, the event query host 102 may be configured to delete entries from the database that represent vertices or edges that, according to corresponding timestamps, are more than seven days old. Because the event graph 108 may be stored in local memory at the event query host 102, as described herein, purging entries with timestamps older than a defined TTL period can limit the size of the event graph 108 stored in the local memory.

However, in some examples, the timestamp 312 of an entity may be updated by elements of the event query host 102. For example, if a first vertex is added to the event graph 108 at a first time, the first time may be indicated in the corresponding timestamp 312 for the first vertex. However, if an edge and a second vertex, related to the first vertex, is later added to the event graph at a second time, the timestamp 312 of the first vertex may be updated to the second time. If a third vertex that is directly and/or indirectly related to the first vertex is later added to the event graph 108 at a third time, the timestamp 312 of the first vertex may be updated to the third time.

Accordingly, in some cases, if an entity continues to be related to other entities that were added to the event graph 108 more recently, the timestamp of the entity can be updated such that it can be stored in the event graph 108 for longer than a defined TTL period. As an example, if a first vertex was initially added to the event graph 108 eight days ago, but a related vertex or edge was added to the event graph 108 two days ago, the timestamp of the first vertex can have been updated to two days ago. The event query host 102 may thus maintain the eight-day-old first vertex in the event graph 108 because its timestamp was update to two days ago, even if the event query host 102 is configured to delete entities that have timestamps older than seven days. Accordingly, because the older first vertex may be related to the newer vertex or edge, and may potentially be part of event patterns or sub-graphs indicated by query criteria 130 for one or more queries 110, the first vertex can be kept in the event graph 108 and be analyzed by the query manager 128 even if other entities added eight days ago, that were not found to be related to other newer entities, were deleted from the event graph 108 after seven days.

Information in the database about entities of the event graph 108, such as the example data shown in FIG. 3, may be accessed by the query manager 128 when the query manager 128 executes query instances 112. For example, the query manager 128 may use entity keys, such as the entity key 300, to identity vertices 202 that represent events and/or edges 204 that represent relationships between such events, as the query manager 128 searches the event graph 108 for sub-graphs or other query criteria 130 associated with query instances.

FIG. 4 shows an example 400 of query criteria 130 for a query that can be executed against the event graph 108. As discussed above, the query criteria 130 for a query may indicate a pattern of one or more events that are relevant to the query, such as a pattern of events that may indicate malicious behavior on the computing device 106. For example, the query criteria 130 may indicate a type of each event in the pattern, relationships between the events in the pattern, timeframes associated with relationships between the events in the pattern, and/or any other information about the pattern of events. This type of information may be expressed in a graph representation, similar to the graph representation of the event graph 108 discussed above with respect to FIG. 2 and FIG. 3. For instance, query criteria 130 for a query may indicate information about one or more events in a pattern using corresponding vertices of a graph, as shown in FIG. 4. Similarly, information about relationships between the events in the pattern can be represented using edges in the graph, as shown in FIG. 4.

In example 400, the query criteria 130 may be a pattern that includes four events represented in a graph by a first vertex 402, a second vertex 404, a third vertex 406, and a fourth vertex 408. The first vertex 402 may represent a first event in which a "RunDLL32.exe" begins executing on the computing device 106. The second vertex 404 may represent a second event in which a network connection is opened from the computing device 106 to an external IP address. The third vertex 406 may represent a third event in which either a "powershell.exe" process or a "cmd.exe" process begins executing on the computing device 106. The fourth vertex 408 may represent a fourth event in which any type of child process begins executing on the computing device 106.

In the graph shown in FIG. 4, the first vertex 402 and the second vertex 404 may be linked by a first edge 410, the first vertex 402 and the third vertex 406 may be linked by a second edge 412, and the third vertex 406 and the fourth vertex 408 may be linked by a third edge 414. These edges may represent specific relationships between the events represented by the vertices, such as an indication that one event initiated another event. The vertices and/or the edges may also indicate timing criteria associated with the events.

For instance, overall, the graph shown in FIG. 4 may represent a pattern in query criteria 130 for a query that is satisfied if:
A. a "RunDLL32.exe" process (represented by the first vertex 402) launches on the computing device 106;
B. an external network connection (represented by the second vertex 404) is made by the "RunDLL32.exe" process (a relationship indicated by the first edge 410) within 24 hours of launch of the "RunDLL32.exe" process;
C. the "RunDLL32.exe" process launches either a "powershell.exe" process or a "cmd.exe" process (represented by the third vertex 406) as a child process (a relationship indicated by the second edge 412) within thirty minutes of initiating the external network connection; and
D. the "powershell.exe" process or the "cmd.exe" process itself launches any process (represented by the fourth vertex 408), as a child process (a relationship indicated by the third edge 414) within thirty minutes of launch of the "powershell.exe" process or the "cmd.exe" process.

If the query queue 114 includes a query instance associated with the graph shown in FIG. 4, the query manager 128 may execute the query instance by performing graph traversal operations and/or graph isomorphism operations to attempt to find one or more sub-graphs, within the event graph 108, that match the graph shown in FIG. 4. For example, the query manager 128 may search for a vertex in the event graph 108 that indicates a launch of a "RunDLL32.exe" process, determine whether that vertex is linked in the event graph 108 by edges to other vertices indicating that the "RunDLL32.exe" process initiated an external network connection within 24 hours and also launched either a "powershell.exe" process or a "cmd.exe" process within thirty minutes of initiating the network connection, and also determine whether a vertex representing the "powershell.exe" process or the "cmd.exe" process is linked in the event graph 108 by another edge to a vertex representing a child process launched by the "powershell.exe" process or the "cmd.exe" process within thirty minutes of launch of the "powershell.exe" process or the "cmd.exe" process.

One of the events in the query criteria 130 may be the trigger event for the associated query that causes the event processor 122 to add a corresponding query instance 112 to the query queue 114. For example, the "RunDLL32.exe" process event represented by the first vertex 402 may be the trigger event for the query shown in FIG. 4. Accordingly, if the event processor 122 identifies a "RunDLL32.exe" process event in the event stream 104, the event processor 122 may add a vertex that represents the "RunDLL32.exe" process event to the event graph 108, and also add a query instance to the query queue 114 that is associated with the query criteria 130 shown in FIG. 4.

In some examples, other elements of the query criteria 130 may or may not already be present in the event graph 108 when the event processor 122 identifies the trigger event and adds the query instance to the query queue 114. For example, if event data arrives out-of-order in the event stream 104, vertices 202 corresponding to one or more of the second vertex 404, the third vertex 406, and the fourth vertex 408 may already be present in the event graph 108 by the time the event processor 122 identifies the "RunDLL32.exe" process event in the event stream 104. Accordingly, the query manager 128 may successfully locate all of the elements of the query criteria 130 in the event graph 108 when the query manager 128 first executes the query instance. The event query host 102 may accordingly output query results 118 indicating that a match for the query instance has been found in the event graph 108.

However, if a trigger event arrives in the event stream 104 before one or more other elements of the query criteria 130, it may be possible that not all of the other elements of the query criteria 130 are present within the event graph 108 when the query manager 128 executes the query instance at the scheduled execution time indicated in the query queue 114. For example, if the "RunDLL32.exe" trigger event arrives before the events represented by the second vertex 404, the third vertex 406, and the fourth vertex 408, the events represented by one or more of the second vertex 404, the third vertex 406, and the fourth vertex 408 may not yet be represented in the event graph 108 when the query manager 128 first attempts to find the pattern of events shown in FIG. 4 within the event graph 108. In this situation, the query manager 128 may determine which of the elements of the query criteria 130 are present within the event graph 108, store information associated with those elements of the query criteria 130 as a partial query state associated with the query instance, and reschedule the query instance with a later scheduled execution time in the query queue 114.

For example, during a first execution of a query instance, the query manager 128 may find a "RunDLL32.exe" process event in the event graph 108 that matches the first vertex 402, find an external network connection event in the event graph 108 that matches the second vertex 404, and determine that the two events are related according to a relationship defined by the first edge 410. However, during the first execution of the query instance, the query manager 128 may not find events or relationships in the event graph 108 that match the third vertex 406, the fourth vertex 408, the second edge 412, and/or the third edge 414. Accordingly, the query manager 128 may store partial query state information associated with the query instance indicating that matches for the first vertex 402, the second vertex 404, and the first edge 410 have been found in the event graph 108.

Accordingly, when the query manager 128 executes the query instance again at the new scheduled execution time, the query manager 128 can use the partial query state to avoid searching for the previously found elements of the query criteria 130, and instead search just for the remaining elements of the query criteria 130 that have not yet been found. For example, if the partial query state indicates that matches for the first vertex 402, the second vertex 404, and the first edge 410 were previously found in the event graph 108, the query manager 128 can avoid searching for those elements again in the event graph 108, and can instead search the event graph 108 specifically for matches for the third vertex 406, the fourth vertex 408, the second edge 412, and the third edge 414.

As another example, the trigger event for a query may be the child process event represented by the fourth vertex 408 shown in FIG. 4, instead of the "RunDLL32.exe" process event represented by the first vertex 402, because the full event pattern shown in FIG. 4 may be more likely to be present in the event graph 108 after an entity representing a child process of a "powershell.exe" process or a "cmd.exe" process has been added to the event graph 108. Accordingly, in this example, if the event processor 122 identifies an event associated with a child process of a "powershell.exe" process or a "cmd.exe" process in the event stream 104, the event processor 122 may add a vertex that represents the child process event to the event graph 108, and also add a query instance to the query queue 114 that is associated with the query criteria 130 shown in FIG. 4. However, if event data arrives out-of-order as discussed above, it may still be possible that not all of the other elements shown in FIG. 4 are present within the event graph 108 when the query manager 128 executes the query instance at the scheduled execution time indicated in the query queue 114. For instance, although information about the child process of a "powershell.exe" process or a "cmd.exe" process may have arrived by the scheduled execution time for the query instance, is possible that the event query host 102 has not yet received information about a parent "RunDLL32.exe" process event or a corresponding external network connection event. Accordingly, the query manager 128 may store partial query state information indicating that some portions of the pattern shown in FIG. 4 have already been found in the event graph 108, such that the query manager 128 can avoid searching for those elements again in the event graph 108 during the next execution of the query instance.

If the combination of the partial query state and results of the new search indicate that all of the elements of the query criteria 130 are, and/or were, present in the event graph 108, the event query host 102 may accordingly output query results 118 indicating that a match for the query instance has been found in the event graph 108. If the query manager 128 is again unable to find all of the elements of the query criteria 130, the query manager 128 may update the partial query state based on any additional elements that were found, and reschedule the query attempt for another later scheduled execution time.

Multiple query instances 112 may, in some cases, be associated with query criteria 130 that has one or more shared elements. For example, two or more query instances 112 may be associated with graphs that may have one or more shared entities. In these examples, if the query manager 128 is executing a particular query instance and finds an entity in the event graph 108 that matches query criteria 130 for that particular query instance, as well as query criteria 130 for one or more other query instances 112 in the query queue 114 that the query manager 128 is not currently executing, the query manager 128 may be configured to modify partial query states 134 of the other query instances 112 to indicate that the matching entity has been found. As a non-limiting example, query instance 112A and query instance 112B may both be associated with an event pattern that looks for a "RunDLL32.exe" process, although other elements of the event patterns may differ. In this example, if the query manager 128 finds a "RunDLL32.exe" process when executing query instance 112B, the query manager 128 may be configured to modify the partial query state 134A for query instance 112A to indicate that the "RunDLL32.exe" process has been found in the event graph 108, even though the query manager 128 was not executing query instance 112A. Accordingly, the query manager 128 can avoid searching the event graph 108 for the "RunDLL32.exe" process again when query instance 112A is later executed.

Although the event query host 102 shown in FIG. 1 may be associated with the computing device 106, in some examples the event query host 102 may also be associated with one or more additional computing devices. In some examples, the event query host 102 may maintain different event graphs, and/or different query queues, for each of the computing devices. In other examples, the event graph 108 may contain event data associated with multiple computing devices. For instance, data associated with entities in the event graph 108 may be associated with the CID 302 and/or AID 304 discussed above to distinguish entities in the event graph 108 that are associated with different customers and/or sensors. Accordingly, in some examples, one event query host may process event data associated with multiple computing devices. Additionally, in some examples, multiple event query hosts may each be associated with different sets of computing devices, as discussed below with respect to FIG. 5.

Figure 5:
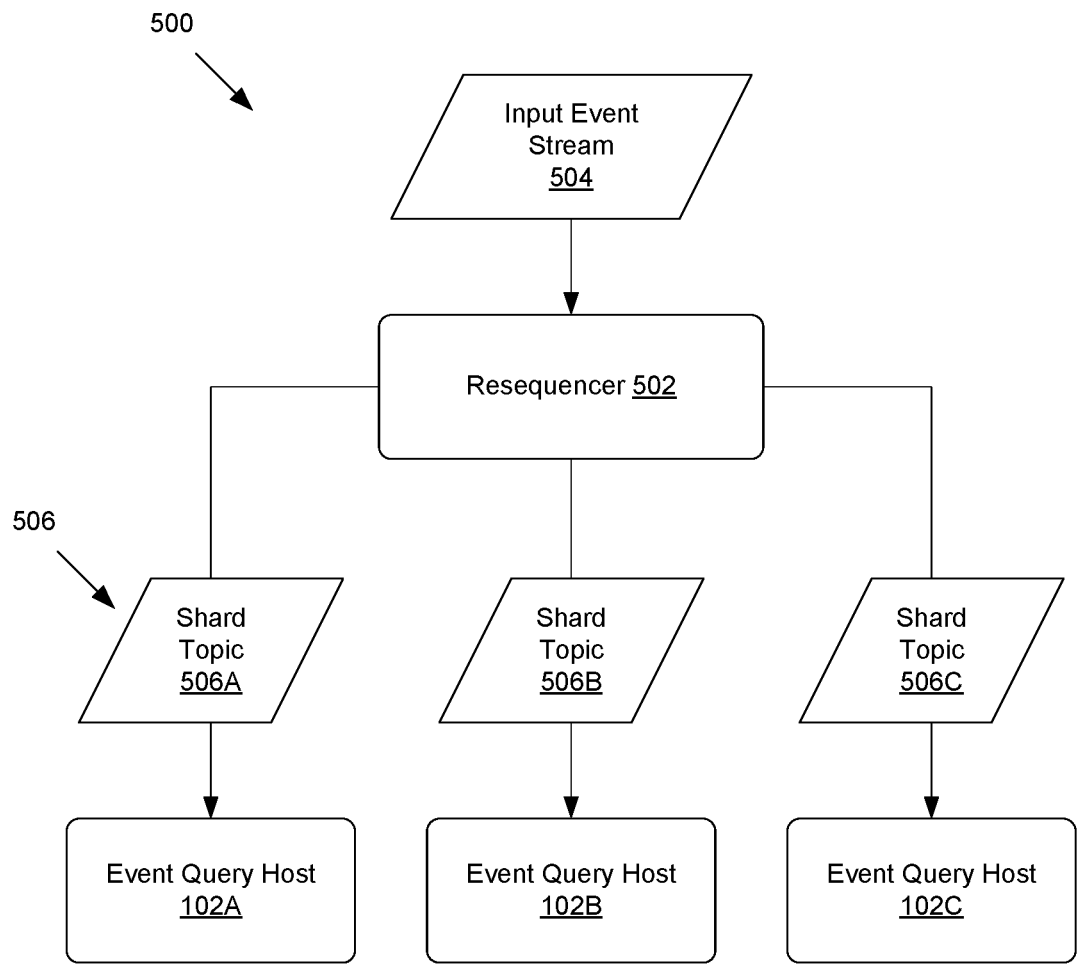
FIG. 5 shows an example in which a security system includes multiple event query hosts, as well as a resequencer configured to process an input event stream.

FIG. 5 shows an example 500 in which the security system includes multiple event query hosts, such as event query host 102A, event query host 102B, and event query host 102C, as well as a resequencer 502 configured to process an input event stream 504. The input event stream 504 can include event data sent to the security system by local sensors on one or more computing devices. The local sensors may send the event data to the security system over temporary or persistent connections. A termination service or process of the security system (not shown) can receive event data transmitted by multiple sensors, and can provide the collected event data to the resequencer 502 as the input event stream 504.

The event data in the input event stream 504 may be in a random or pseudo-random order when it is received by the resequencer 502. For example, event data for different events may arrive at the resequencer 502 in the input event stream 504 in any order, without regard for when the events occurred on computing devices. As another example, event data from local sensors on different computing devices may be mixed together within the input event stream 504 when they are received by the resequencer 502, without being sorted based on sensor identifiers. However, the resequencer 502 can perform various operations to sort and route the event data to different event query hosts.

The different event query hosts can be associated with different shards within the security system. Each shard can be a distinct instance that includes a distinct event query host. As discussed above, each distinct event query host can also locally store at least one event graph and locally execute queries 110 against the locally-stored event graph. Each shard may be associated with a unique shard identifier.

Each shard, including a distinct event query host, may be associated with a distinct set of computing devices and/or a set of sensors executing on those computing devices. Each of the sensors may be associated with a unique sensor identifier, such as the AID 304 discussed above. Each shard, and its event query host, may be associated with a particular range of sensor identifiers or a particular set of sensor identifiers, and accordingly be associated with a set of corresponding computing devices. As such, each individual computing device may be associated with a particular shard, and a particular one of the event query hosts, in the security system. As a non-limiting example, a first computing device may be associated with event query host 102A, and event query host 102A may maintain a first event graph associated with events that occurred on the first computing device. A second computing device may instead be associated with event query host 102B, and event query host 102B may maintain a distinct second event graph associated with events that occurred on the second computing device.

The resequencer 502 can be configured to sort and/or route event data from the input event stream 504 into distinct shard topics 506 associated with the different shards, such as shard topic 506A associated with event query host 102A, shard topic 506B associated with event query host 102B, and shard topic 506C associated with event query host 102C. The shard topics 506 can be queues or sub-streams of event data, such as the event stream 104 discussed above, that are associated with the corresponding shards. Event data sorted into a shard topic can be processed, as the event stream 104, by the corresponding event query host 102. Accordingly, although the input event stream 504 may include event data from numerous computing devices, the resequencer 502 can sort the input event stream 504 and provide each of the event query hosts with event streams that include data about events that occurred on the specific sets of computing devices associated with each of those event query hosts.

Because the resequencer 502 can cause each shard to receive event data from sensors specifically associated with that shard, an event query host in a particular shard can locally store one or more event graphs that represent events that occurred on computing devices associated with that shard. Event data associated with a single computing device can thus be stored in a single event graph associated with a single event query host, for example as shown in FIG. 1. Accordingly, each event query host can locally execute query instances against a locally-stored event graph, without transmitting queries over a network to a cloud database or other remote or centralized database of event data.

In some examples, the resequencer 502 can determine which shard is associated with an instance of event data in the input event stream based on an AID or other identifier of the sensor that sent the event data. For example, the resequencer 502 can perform a modulo operation to divide an AID value, associated with an instance of event data, by the number of shards, find the remainder of the division, and find a shard with an identifier that matches the remainder. As an example, if there are ten thousand shards in the security system, and a remainder of a modulo operation on the AID of a sending sensor is "60," the resequencer 502 can determine that the sending sensor is associated with a shard having an identifier of "60." The resequencer 502 can route the event data into a shard topic associated with shard "60," such that the event data can be received and processed by the event query host associated with shard "60."

The resequencer 502 may also, or alternately, use a consistent hashing ring to determine which shard is associated with an instance of event data in the input event stream, as a fallback or alternate option to the modulo operation discussed above. For instance, if the number of shards is changed from a fixed number, the modulo operation performed on a sensor identifier value as discussed above may generate a different remainder, and thus may no longer correspond with an identifier of the shard associated with the sensor. However, even if the number of shards (and thus the number of event query hosts) changes, consistent hashing can be used to identify shard associated with particular sensors.

In some examples, the security system may expand the number of shards, and the number of corresponding event query hosts, by spinning up multiple instances of the security system. Each system instance may have a fixed number of shards, such that the shard associated with a sensor can be identified from a sensor identifier using the modulo operation discussed above. For example, each system instance may have 1024 shards, such that two system instances may have 2048 shards in total. Shard identifiers may be unique within each system instance, but may be re-used in different system instances. Accordingly, a particular sensor on a computing device may be associated with a particular instance, as well as a particular shard within that instance. As a non-limiting example, the resequencer 502 may be configured to determine that event data in the input event stream 504 is associated with a CID and/or AID mapped to a second system instance, and also use a modulo operation to determine that the AID corresponds to shard #725 in the second system instance.

The security network may, in some examples, include a cluster of resequencers that are associated with different shards. A resequencer, within the cluster, that receives or first operates on an instance of event data in the input event stream 504 may determine, based on a sensor identifier, whether that resequencer is part of the shard associated with the sensor that sent the event data. If the receiving resequencer is part of the shard associated with the sending sensor, the resequencer can route the event data to the shard topic for that shard. If the resequencer that initially processes the instance of event data instead determines that it is not part of the shard associated with the sending sensor, the resequencer can forward the event data to a different resequencer in the cluster that is part of the shard associated with the sending sensor. In some examples, a resequencer can send event data to another resequencer in the cluster via a remote procedure command (RPC) connection or channel.

In other examples, the security network may have a fleet of resequencer hosts associated with multiple sets of shards and multiple clusters of event query hosts. In these examples, the fleet of resequencer hosts may receive event data, and process a CID associated with the event data to identify which cluster of event query hosts is associated with the CID. The fleet of resequencer hosts may also hash an AID associated with the event data to identify a particular shard associated with the AID within the identified cluster of event query hosts. The fleet of resequencer hosts can accordingly forward the event data as part of the identified shard in association with the identified cluster of event query hosts, such that the event data is received by the particular event query host that corresponds with the shard identified by the AID, in the cluster identified by the CID.

The event query hosts associated with the shards may each locally store event graphs, queries, query queues, and/or other data in local databases. However, in some examples, an event query host associated with one shard may periodically or occasionally transmit a copy of state data associated with the locally-stored information to one or more other event query hosts associated with other shards. State data associated with one event query host may accordingly be stored at one or more other event query hosts for fault tolerance and/or backup purposes.

As a non-limiting example, event query host 102A may provide state data, associated with data stored locally by event query host 102A, to event query host 102B. If event query host 102A goes offline or experiences other errors, event query host 102B or another event query host can be configured as a replacement for event query host 102A, based on the stored state data associated with event query host 102A. For instance, a replacement event query host can instantiate a replacement event graph and a replacement query queue based on the stored state data associated with event query host 102A. The replacement event query host can thus be loaded with a full local copy of the event graph and query queue that had been stored by the event query host 102A, and the replacement event query host can thereby take over for event query host 102A and process new event data in the shard topic 506A.

One or more event query hosts can execute processes associated with the event processor 122 and the query manager 128. Examples of such processes are shown and described with respect to FIG. 6, FIG. 7, and FIG. 8.

Figure 6:
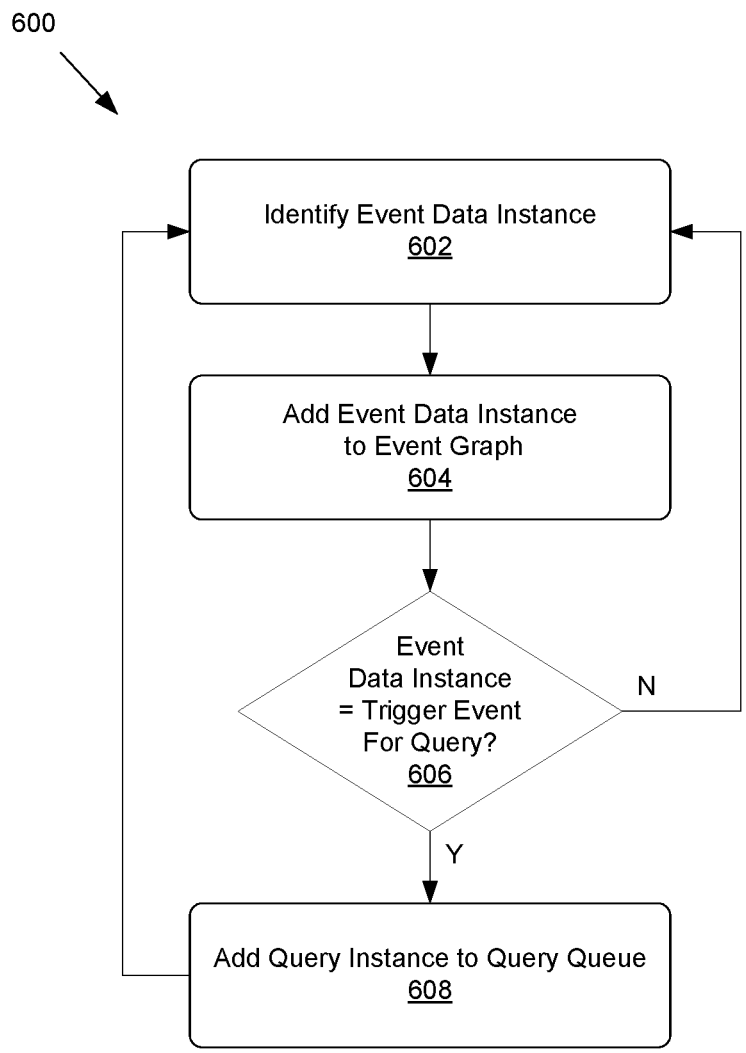
FIG. 6 shows a flowchart of an example process for modifying an event graph, and adding query instances to a query queue, substantially in real-time based on an event stream.

FIG. 6 shows a flowchart of an example process 600 for modifying the event graph 108, and adding query instances to the query queue 114, substantially in real-time based on the event stream 104. The example process 600 shown in FIG. 6 may be performed by a computing system that executes the event processor 122 as part of the event query host 102, such as the computing system shown and described with respect to FIG. 9.

At block 602, the event processor 122 can identify an event data instance. For example, the event processor 122 may identify an event data instance within the event stream 104 received by the event query host 102. As discussed above, the event stream 104 can be a data stream that indicates events, detected by the sensor 120, that have occurred on the computing device 106. Accordingly, at block 602, the event processor 122 can identify an individual instance of event data indicated by information within the event stream 104. In some examples, the event processor 122 may receive event streams, associated with multiple computing devices and sensors, within a shard topic, as discussed above with respect to FIG. 5. The event processor 122 may accordingly identify an event data instance, associated with one of those computing devices, within the shard topic at block 602.

At block 604, the event processor 122 can add one or more entities to the event graph 108 that are associated with the event data instance identified at block 602. For example, the event processor 122 can add a vertex to the event graph 108 that represents the event data instance, and/or add an edge to the event graph 108 that represents a relationship between events represented vertices 202 in the event graph 108. The event processor 122 may add an entity to the event graph 108 at block 604 by adding an entry to a database, as discussed above with respect to FIG. 3.

At block 606, the event processor 122 can determine whether the event data instance is a trigger event associated with a query. As discussed above, the event query host 102 can be configured with query definitions 124 for one or more queries 110, including indications of trigger events 126 for the queries 110. The event processor 122 can accordingly use the query definitions 124 to determine whether the event data instance, identified at block 602, matches a trigger event for a query. A trigger event for a query may be associated with an event type, and/or one of more filters, as discussed above.

If the event data instance identified at block 602 does not match a trigger event for any of the queries (Block 606—No), the event processor 122 can return to block 602, after adding a representation of the event data instance to the event graph 108, and process a subsequent instance of event data within the event stream 104. However, if the event data instance identified at block 602 does match a trigger event for a query (Block 606—Yes), the event processor 122 can add a corresponding query instance to the query queue 114. The event processor 122 may add the new query instance to the query queue 114 with a scheduled execution time selected based on a default scheduling configuration, based on a rescheduling scheme associated with the query, or based on any other scheduling configuration. The event processor 122 can then return to block 602, and process a subsequent instance of event data within the event stream 104.

Overall, as shown in FIG. 6, the event processor 122 may add a representation of each identified event data instance, substantially in real-time as the event data is received and processed by the event processor 122. The event processor 122 may also, substantially in real-time as the event data is received and processed by the event processor 122, add query instances 112 to the query queue 114 that are associated with event data instances that correspond to trigger events for queries 110, but avoid adding query instances 112 to the query queue 114 that are associated with instances of event data that do not correspond to trigger events 126 for queries 110. Accordingly, the query instances 112 that are scheduled within the query queue 114 by the event processor 122 at block 608 can be likely to be at least partially satisfied when executed by the query manager 128, because event data corresponding to trigger events 126 for those query instances 112 was added to the event graph 108 at block 604.

Figure 7:
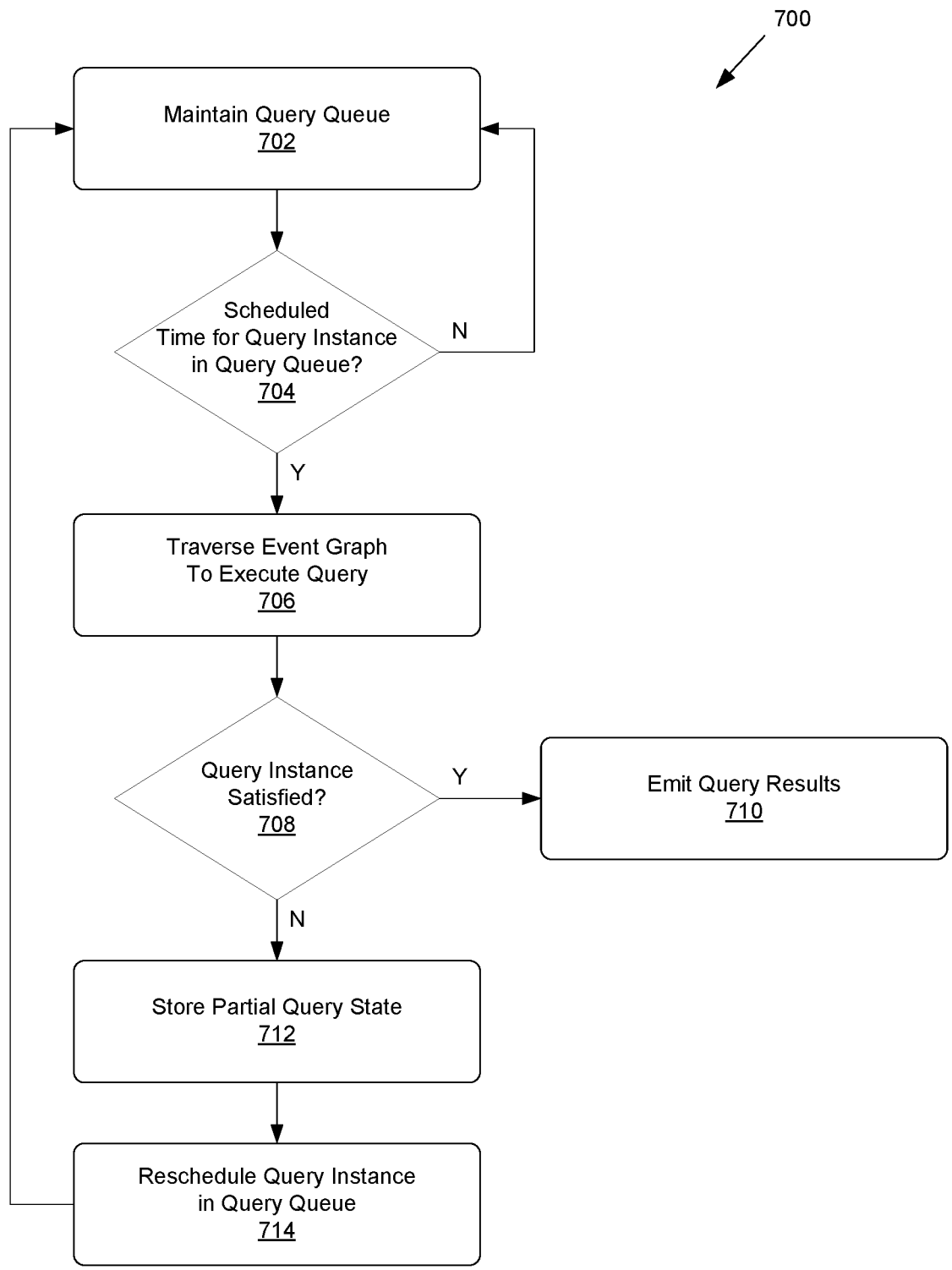
FIG. 7 shows a flowchart of an example process for executing, at scheduled execution times, query instances in a query queue.

FIG. 7 shows a flowchart of an example process 700 for executing, at scheduled execution times 116, query instances 112 in the query queue 114. The example process 700 shown in FIG. 7 may be performed by a computing system that executes the query manager 128 as part of the event query host 102, such as the computing device shown and described with respect to FIG. 9.

At block 702, the query manager 128 may maintain the query queue 114. As discussed above, the query queue 114 may be an ordered list or database of query instances 112 sorted by scheduled execution times 116. For example, the highest-priority query instance in the query queue 114 may be the query instance with the next scheduled execution time.

At block 704, the query manager 128 can determine if it is the scheduled execution time for a query instance in the query queue 114. For example, if it is not yet the scheduled execution time for the highest-priority query instance in the query queue 114, the query manager 128 can continue to maintain the query queue 114 at block 702 until the scheduled execution time for the highest-priority query instance in the query queue 114.

At the scheduled execution time for a query instance in the query queue, the query manager 128 may execute the query instance at block 706 by traversing the event graph 108 and searching for one or more entities in the event graph 108 that correspond with the query criteria 130 of the query instance. The query criteria 130 may be a pattern of one or more events, for instance as described above with respect to the example shown in FIG. 4. As a non-limiting example, at block 706 the query manager 128 can use graph isomorphism principles and/or perform graph traversal operations to search for one or more sub-graphs, within the event graph 108, that match a graph of events associated with the query instance.

In some examples, if the query instance is associated with a partial query state that indicates portions of the query criteria 130 previously found in the event graph 108, the query manager 128 may avoid searching the event graph 108 for the previously found portions of the query criteria 130. The query manager 128 may instead attempt to locate other portions of the query criteria 130 that have not yet been found in the event graph 108, but would satisfy the query criteria 130 in combination with the partial query state.

At block 708, the query manager 128 can determine if the query instance has been satisfied. For example, query manager 128 can determine if all of the elements of the query criteria 130 associated with the query instance have been found in the event graph 108, either based on the search performed at block 706 and/or in combination with a prior partial query state associated with the query instance. If all of the elements of the query criteria 130 associated with the query instance have been found in the event graph 108, the query manager 128 can determine if the query instance has been satisfied (Block 708—Yes) and can output corresponding query results 118 at block 710.

However, if the query manager 128 determine that the query instance has not yet been satisfied (Block 708—No), the query manager 128 may store the partial query state associated with the query instance. For example, if one or more portions of the query criteria 130 were found in the event graph 108 during the search performed at block 706, the query manager 128 may store those portions as a new partial query state associated with the query instance, or add the newly located portions to a previously-stored partial query state associated with the query instance.

At block 714, the query manager 128 can reschedule the query instance within the query queue 114, based on the rescheduling scheme associated with the query instance. For instance, if the query instance is associated with query 110A shown in FIG. 1, the rescheduling scheme 132A may indicate that 99% of the query instances associated with query 110A have historically been satisfied within the event graph 108 within five minutes. Accordingly, in some examples, the query manager 128 can be configured to adjust the scheduled execution time of the query instance such that the query instance is scheduled to be re-executed five minutes from the current time, or is scheduled to be re-executed during a window of time surrounding five minutes from the current time. In other examples, the query manager 128 can be configured to reschedule the query instance to be re-executed five minutes, or within a window of time surrounding the five-minute mark, after the query instance was initially added to the query queue 114.

The query manager 128 can, after rescheduling the query instance at block 714, return to block 702 and 704 to determine when it is the scheduled execution time for the next query instance in the query queue 114. The query manager 128 can accordingly execute query instances 112 in the query queue 114 at different execution times that are determined based on rescheduling schemes 132 associated with the query instances 112.

Figure 8:
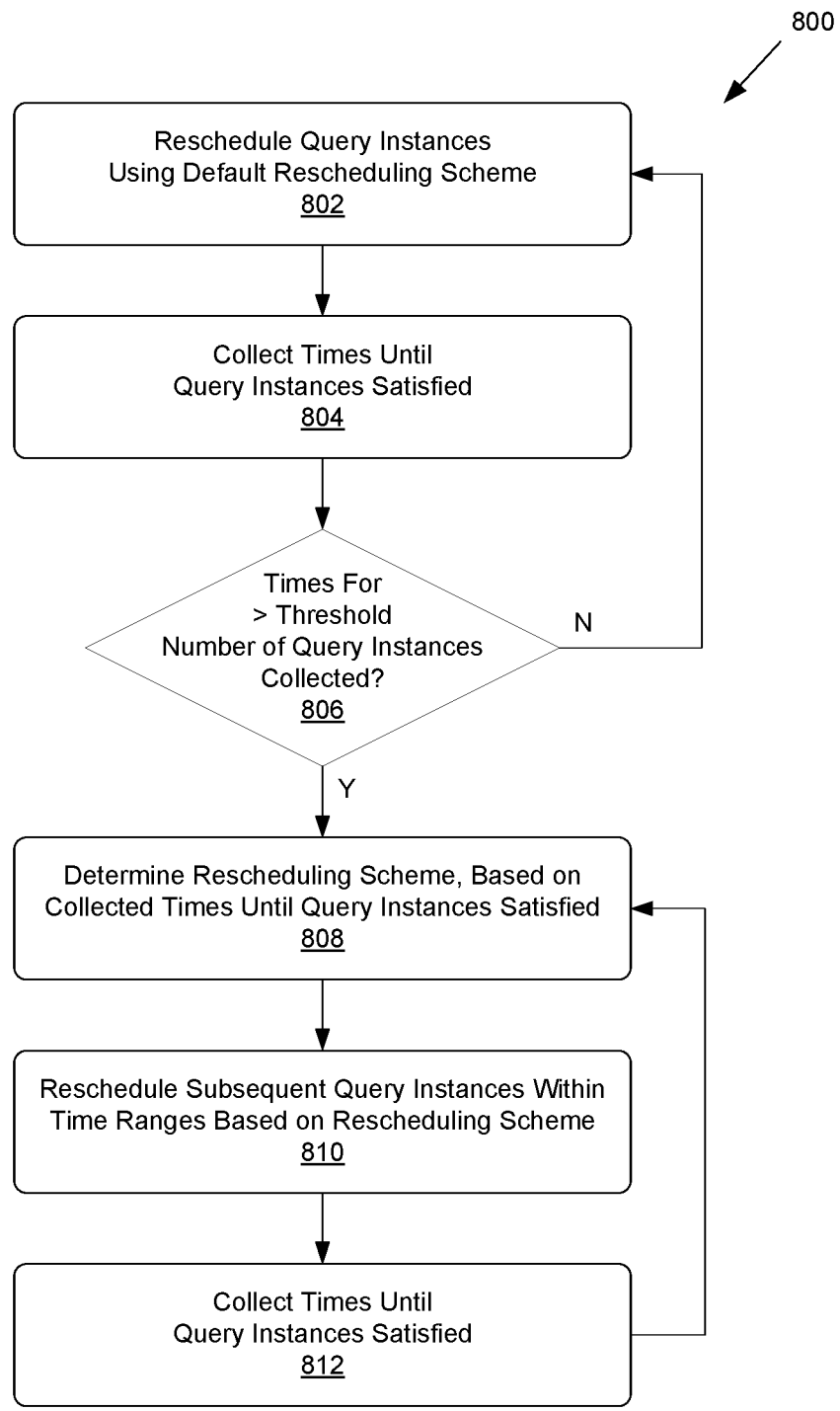
FIG. 8 shows a flowchart of an example process for determining rescheduling schemes associated with queries.

FIG. 8 shows a flowchart of an example process 800 for determining rescheduling schemes 132 associated with queries 110. The example process 800 shown in FIG. 8 may be performed by a computing system that executes the query manager 128 as part of the event query host 102, such as the computing device shown and described with respect to FIG. 9.

At block 802, the query manager 128 can use a default rescheduling scheme associated with a particular query to reschedule any query instances 112, associated with the particular query, that were executed but not satisfied. In some examples, the default rescheduling scheme associated with the particular query may indicate that any query instances that are not satisfied should be re-executed every minute, or on any other consistent basis. In other examples, the default rescheduling scheme associated with the particular query may indicate that any query instances that are not satisfied should be re-executed after varying wait times selected according to an exponential backoff scheme, or any other default rescheduling scheme.

At block 804, the query manager 128 can monitor and collect durations of time that it takes for query instances 112, associated with the particular query, to be satisfied. For example, when the query manager 128 uses the process 700 shown in FIG. 7 to execute query instances, the query manager 128 may determine how long it takes for each of the query instances to be satisfied at block 708, either during an initial execution attempt or after one or more subsequent execution attempts after changes to scheduled execution times 116 at block 714.

At block 806, the query manager 128 can determine if at least a threshold number of time durations, associated with the query instances, has been collected while looping through block 802 and block 804. The threshold number of time durations may be a predefined value, such as 25, 50, 75, 100, or any other number of time durations. If fewer than the threshold number of time durations has been collected (Block 806—No), the query manager 128 can continue to reschedule query instances 112 associated with the particular query according to the default rescheduling scheme at block 802, and can continue collecting corresponding time durations until those query instances 112 are satisfied at block 804.

However, if at least the threshold number of time durations, for the query instances to be satisfied, has been collected (Block 806—Yes), the query manager 128 can determine a new rescheduling scheme at block 808 based on the historical time durations collected over time. As discussed above, the query manager 128 can use statistical analysis, machine learning, and/or any other technique to evaluate the collected historical information about how long it took for prior query instances to be satisfied, and to generate a new rescheduling scheme for the particular query based on that analysis. For example, the query manager 128 may determine that it takes three minutes on average for instances of the particular query to be satisfied, or that according to a 99% percentile metric, 99% of prior instances of the particular query were satisfied within five minutes.

Accordingly, at block 810, the query manager 128 may reschedule subsequent unsuccessful query instances 112 associated with the particular query within a time window associated with the rescheduling scheme determined at block 808. For example, if the query manager 128 determined that it takes three minutes on average for instances of the particular query to succeed, the query manager 128 can reschedule any additional instances of the particular query based on a time window surrounding the average three-minute success time, such as resetting the scheduled execution times 116 of the query instances based on any wait times within a two to four-minute window.

At block 812, the query manager 128 can continue to monitor and collect durations of time that it takes for query instances 112 to be satisfied, similar to block 804. The query manager 128 can also refine the rescheduling scheme at block 808, based on additional historical time durations collected at block 802. Accordingly, after initially determining the rescheduling scheme at block 806, the query manager 128 may continue to collect new historical information at block 812 about times it takes for query instances to be satisfied. As such, the query manager 128 can determine at block 808 whether to adjust the rescheduling scheme to be associated with higher or lower wait times, based on the additional historical information collected at block 812.

Figure 9:
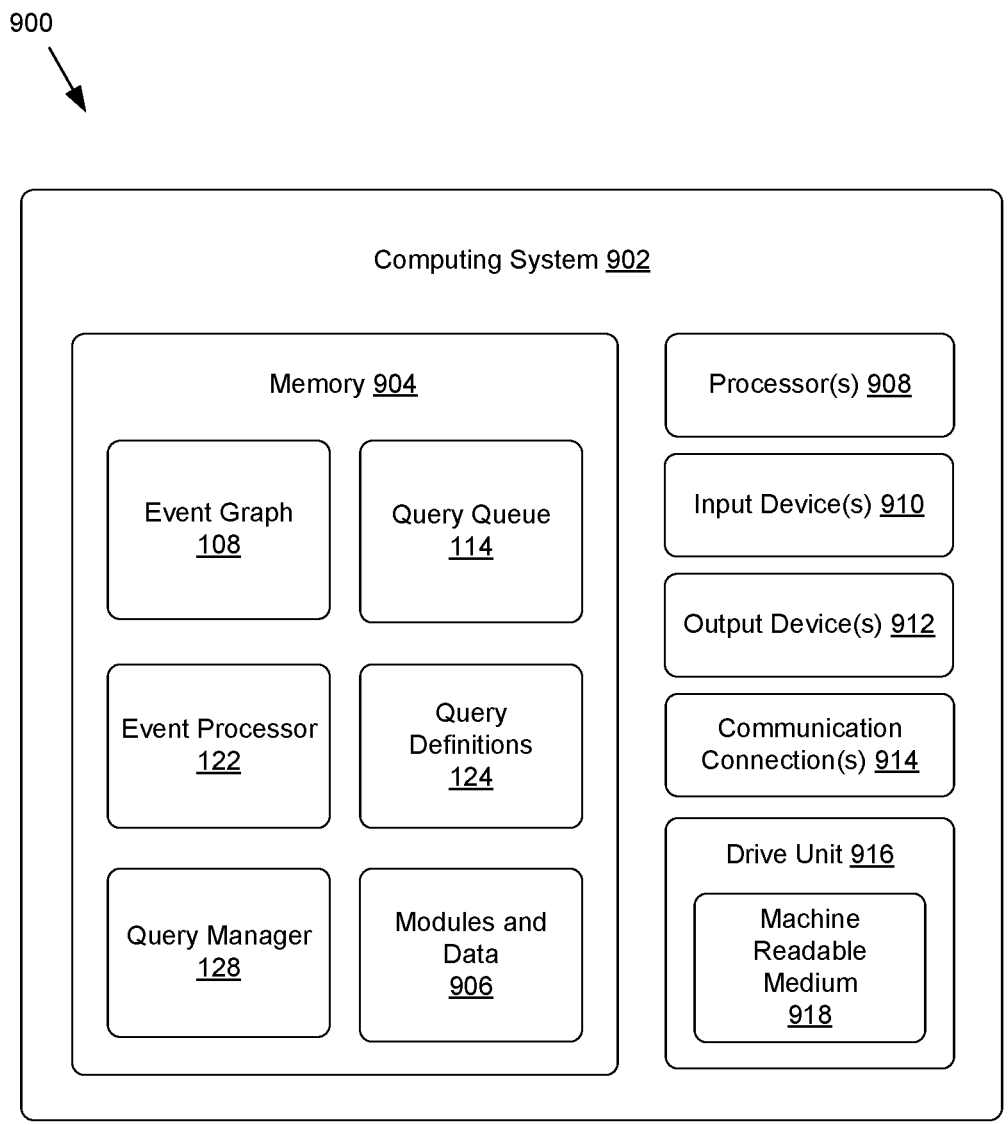
FIG. 9 shows an example system architecture for a computing system associated with an event query host.

FIG. 9 shows an example system architecture 900 for a computing system 902 associated with the event query host 102 described herein. The computing system 902 can be a server, computer, or other type of computing device that executes one or more event query hosts. In some examples, the event query host 102 can be executed by a dedicated computing system 902. In other examples, the computing system 902 can execute one or more event query hosts via virtual machines or other virtualized instances. For instance, the computing system 902 may execute multiple event query hosts in parallel, as shown in FIG. 5, using different virtual machines, parallel threads, or other parallelization techniques.

The computing system 902 can include memory 904. In various examples, the memory 904 can include system memory, which may be volatile (such as RAM), non-volatile (such as ROM, flash memory, non-volatile memory express (NVMe), etc.) or some combination of the two. The memory 904 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing system 902. Any such non-transitory computer-readable media may be part of the computing system 902.

The memory 904 can store data associated with the event graph 108, the query definitions 124, the query queue 114, the event processor 122, the query manager 128, and/or any other element of the event query host. As discussed above, the event graph 108 may be stored locally in the memory 904 such that the event processor 122 and/or the query manager 128 can locally interact with the event graph 108. The memory 904 can also store other modules and data 906. The modules and data 906 can include any other modules and/or data that can be utilized by the computing system 902 to perform or enable performing the actions described herein. Such other modules and data can include a platform, operating system, and applications, and data utilized by the platform, operating system, and applications.

By way of a non-limiting example, the computing system 902 that executes the event query host 102 may have non-volatile memory, such as an NVMe disk configured to store the event graph 108, the query definitions 124, the query queue 114, and/or other data associated with the event query host. The computing system 902 that executes the event query host 102 may also have volatile memory, such as synchronous dynamic RAM (SDRAM), double data rate (DDR) SDRAM, DDR2 SDRAM, DDR3 SDRAM, or DD4 SDRAM.

The computing system 902 can also have one or more processors 908. In various examples, each of the processors 908 can be a central processing unit (CPU), a graphics processing unit (GPU), both a CPU and a GPU, or any other type of processing unit. For example, each the processors 908 may be a 10-core CPU, or any other type of processor. Each of the one or more processors 908 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processors 908 may also be responsible for executing computer applications stored in the memory 904, which can be associated with types of volatile and/or non-volatile memory.

The computing system 902 can also have one or more communication interfaces 910. The communication interfaces 910 can include transceivers, modems, interfaces, antennas, telephone connections, and/or other components that can transmit and/or receive data over networks, telephone lines, or other connections. For example, the communication interfaces 910 can include one or more network cards that can be used to receive the event stream 104 and/or output query results 118.

In some examples, the computing system 902 can also have one or more input devices 912, such as a keyboard, a mouse, a touch-sensitive display, voice input device, etc., and/or one or more output devices 914 such as a display, speakers, a printer, etc. These devices are well known in the art and need not be discussed at length here.

The computing system 902 may also include a drive unit 916 including a machine readable medium 918. The machine readable medium 918 can store one or more sets of instructions, such as software or firmware, that embodies any one or more of the methodologies or functions described herein. The instructions can also reside, completely or at least partially, within the memory 904, processor(s) 908, and/or communication interface(s) 910 during execution thereof by the computing system 902. The memory 904 and the processor(s) 908 also can constitute machine readable media 918.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
identifying, by one or more processors of a computing system, an event that occurred on a computing device;
incorporating, by the one or more processors, information associated with the event into an event graph;
determining, by the one or more processors, that the event corresponds with a trigger event associated with a query in a set of queries, wherein different queries in the set of queries are associated with different trigger events and different query criteria;
adding, by the one or more processors, a query instance associated with the query to a query queue based on determining that the event corresponds with the trigger event, wherein:
the query queue comprises a plurality of query instances sorted based on scheduled execution times at which individual query instances, in the plurality of query instances, are scheduled to be executed, and
the query instance is ordered, within the query queue, based on a particular scheduled execution time associated with the query instance;
delaying, by the one or more processors, execution of the query instance until a current time matches the particular scheduled execution time associated with the query instance;
executing, by the one or more processors, and at the particular scheduled execution time associated with the query instance, the query instance by:
identifying an event pattern defined by query criteria associated with the query, and
searching the event graph for a sub-graph that matches the event pattern;
determining, by the one or more processors, and based on executing the query instance, that the sub-graph is not present within the event graph; and
re-ordering, by the one or more processors, the query instance in the query queue to reschedule execution of the query instance to a later scheduled execution time.

2. The computer-implemented method of claim 1, further comprising:
re-executing, by the one or more processors, the query instance at the later scheduled execution time;
determining, by the one or more processors, that the sub-graph is present within the event graph; and
generating, by the one or more processors, query results associated with the query instance based on determining that the sub-graph is present within the event graph.

3. The computer-implemented method of claim 1, wherein the later scheduled execution time associated with the query instance is determined based on a rescheduling scheme associated with the query.

4. The computer-implemented method of claim 3, wherein the rescheduling scheme is determined based on historical information indicating lengths of time taken to determine that the sub-graph was present in event graphs during previous executions of a set of previous instances of the query.

5. The computer-implemented method of claim 1, further comprising:
determining, by the one or more processors based on executing the query instance prior to the re-ordering, that one or more portions of the sub-graph are present within the event graph;
storing, by the one or more processors, a partial query state in association with the query instance, the partial query state indicating the one or more portions of the sub-graph; and
re-executing, by the one or more processors, the query instance at the later scheduled execution time, by searching the event graph for one or more remaining portions of the sub-graph that, in combination with the one or more portions of the sub-graph indicated by the partial query state, matches the event pattern.

6. The computer-implemented method of claim 1, wherein the event graph comprises a plurality of entities comprising vertices that represent events and edges that represent relationships between events.

7. The computer-implemented method of claim 1, wherein the one or more processors identify the event based on shard topic information received from a resequencer, and the resequencer is configured to:
receive an input event stream associated with a plurality of computing devices;
identify an event data instance associated with the event in the input event stream;
determine that the event data instance is associated with the computing device;
determine that the computing device is associated with the computing system; and
provide the event data instance to the computing system in the shard topic information.

8. The computer-implemented method of claim 1, wherein the trigger event associated with the query indicates at least one of:
an event type associated with the query, or
one or more filters associated with the query.

9. The computer-implemented method of claim 1, wherein the trigger event corresponds with a particular event in the event pattern defined by the query criteria associated with the query.

10. The computer-implemented method of claim 1, wherein:
the different queries include at least one of filter queries, metadata queries, or pattern queries, and
the different query criteria associated with the different queries are corresponding criteria for the at least one of the filter queries, the metadata queries, or the pattern queries.

11. A computing system, comprising:
one or more processors; and
memory storing computer-executable instructions that, when executed by the one or more processors, cause the one or more processors to perform operations comprising:
identifying an event that occurred on a computing device;
incorporating information associated with the event into an event graph;
determining that the event corresponds with a trigger event associated with a query in a set of queries, wherein different queries in the set of queries are associated with different trigger events;
adding a query instance associated with the query to a query queue based on determining that the event corresponds with the trigger event, wherein:
the query queue comprises a plurality of query instances sorted based on scheduled execution times at which individual query instances, in the plurality of query instances, are scheduled to be executed, and the query instance is ordered, within the query queue, based on a particular scheduled execution time associated with the query instance;

executing, at the particular scheduled execution time associated with the query instance, the query instance by:
identifying an event pattern associated with the query, and
searching the event graph for a sub-graph that matches the event pattern;

determining, based on executing the query instance, that the sub-graph is not present within the event graph; and re-ordering the query instance in the query queue to reschedule execution of the query instance to a later scheduled execution time.

12. The computing system of claim 11, wherein the operations further comprise:
determining, based on executing the query instance prior to the re-ordering, that one or more portions of the sub-graph are present within the event graph;
storing a partial query state in association with the query instance, the partial query state indicating the one or more portions of the sub-graph; and
re-executing the query instance at the later scheduled execution time, by searching the event graph for one or more remaining portions of the sub-graph that, in combination with the one or more portions of the sub-graph indicated by the partial query state, matches the event pattern.

13. The computing system of claim 11, wherein the later scheduled execution time associated with the query instance is determined based on a rescheduling scheme associated with the query.

14. The computing system of claim 13, wherein the rescheduling scheme is determined based on historical information indicating lengths of time taken to determine that the sub-graph was present in event graphs during previous executions of a set of previous instances of the query.

15. The computing system of claim 11, wherein:
the computing system is part of a security system that comprises a plurality of computing systems associated with different sets of computing devices, and
the security system comprises a resequencer configured to:
receive an input event stream from a plurality of computing devices;
identify sets of event data associated with the different sets of computing devices; and
route the sets of event data to corresponding computing systems of the plurality of computing systems.

16. One or more non-transitory computer-readable media storing computer-executable instructions for an event query host that, when executed by one or more processors, cause the one or more processors to perform operations comprising:

identifying, by an event processor of the event query host, an event that occurred on a computing device;
incorporating, by the event processor, information associated with the event into an event graph;
determining, by the event processor, that the event corresponds with a trigger event associated with a query in a set of queries, wherein different queries in the set of queries are associated with different trigger events;
adding, by the event processor, a query instance associated with the query to a query queue based on determining that the event corresponds with the trigger event, wherein:
the query queue comprises a plurality of query instances sorted based on scheduled execution times at which individual query instances, in the plurality of query instances, are scheduled to be executed, and
the query instance is ordered, within the query queue, based on a particular scheduled execution time associated with the query instance;
executing, by a query manager of the event query host, and at the particular scheduled execution time associated with the query instance, the query instance by:
identifying an event pattern associated with the query, and
searching the event graph for a sub-graph that matches the event pattern;
determining, by the query manager, and based on executing the query instance, that the sub-graph is not present within the event graph; and
re-ordering, by the query manager, the query instance in the query queue to reschedule execution of the query instance to a later scheduled execution time.

17. The one or more non-transitory computer-readable media of claim 16, wherein the operations further comprise:
determining, by the query manager, and based on executing the query instance prior to the re-ordering, that one or more portions of the sub-graph are present within the event graph;
storing, by the query manager, a partial query state in association with the query instance, the partial query state indicating the one or more portions of the sub-graph; and
re-executing, by the query manager, the query instance at the later scheduled execution time, by searching the event graph for one or more remaining portions of the sub-graph that, in combination with the one or more portions of the sub-graph indicated by the partial query state, matches the event pattern.

18. The one or more non-transitory computer-readable media of claim 16, wherein the computer-executable instructions cause the one or more processors to execute the event processor and the query manager via parallel threads.

19. The one or more non-transitory computer-readable media of claim 16, wherein the event graph is stored in a database in local memory accessible by the event processor and the query manager.

* * * * *